United States Patent
Lim et al.

(10) Patent No.: US 11,930,179 B2
(45) Date of Patent: Mar. 12, 2024

(54) VIDEO ENCODING/DECODING METHOD, APPARATUS, AND RECORDING MEDIUM HAVING BITSTREAM STORED THEREON

(71) Applicants: Electronics and Telecommunications Research Institute, Daejeon (KR); INDUSTRY ACADEMY COOPERATION FOUNDATION OF SEJONG UNIVERSITY, Seoul (KR); CHIPS & MEDIA, INC, Seoul (KR); INDUSTRY-UNIVERSITY COOPERATION FOUNDATION KOREA AEROSPACE UNIVERSITY, Goyang-si (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR); Yung Lyul Lee, Seoul (KR); Ji Yeon Jung, Seoul (KR); Nam Uk Kim, Seoul (KR); Myung Jun Kim, Seoul (KR); Yang Woo Kim, Seoul (KR); Dae Yeon Kim, Seoul (KR); Jae Gon Kim, Goyang-si (KR); Do Hyeon Park, Goyang-si (KR)

(73) Assignees: Electronics and Telecommunications Research Institute, Daejeon (KR); INDUSTRY ACADEMY COOPERATION FOUNDATION OF SEJONG UNI, Seoul (KR); CHIPS & MEDIA, INC, Seoul (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 431 days.

(21) Appl. No.: 17/419,142

(22) PCT Filed: Dec. 27, 2019

(86) PCT No.: PCT/KR2019/018584
§ 371 (c)(1),
(2) Date: Jun. 28, 2021

(87) PCT Pub. No.: WO2020/139008
PCT Pub. Date: Jul. 2, 2020

(65) Prior Publication Data
US 2022/0109846 A1  Apr. 7, 2022

(30) Foreign Application Priority Data

Dec. 28, 2018 (KR) .................. 10-2018-0172785
Mar. 11, 2019 (KR) .................. 10-2019-0027494
May 9, 2019 (KR) .................. 10-2019-0054160

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11); *H04N 19/186* (2014.11)

(58) Field of Classification Search
CPC .. H04N 19/132; H04N 19/105; H04N 19/159; H04N 19/176; H04N 19/186
(Continued)

(56) References Cited

U.S. PATENT DOCUMENTS

| | | | | |
|---|---|---|---|---|
| 2014/0112388 A1* | 4/2014 | Lai | ........ | H04N 19/593 |
| | | | | 375/240.12 |
| 2015/0146781 A1* | 5/2015 | Kwon | ........ | H04N 19/182 |
| | | | | 375/240.12 |

(Continued)

FOREIGN PATENT DOCUMENTS

| | | |
|---|---|---|
| KR | 100772576 B1 | 11/2007 |
| KR | 1020140098054 A | 8/2014 |

(Continued)

OTHER PUBLICATIONS

Junyan Huo et al., Non-CE3:Current luma related-CCLM (CCCLM), Joint Video Experts Team (JVET) of ITU-T SG 16 WP 3 and ISO/IEC JTC 1/SC 29/WG 11, JVET-L0108-v2, 12th Meeting: Macao, CN, Oct. 3-12, 2018.

*Primary Examiner* — Matthew David Kim
(74) *Attorney, Agent, or Firm* — BROADVIEW IP LAW, PC

(57) ABSTRACT

An image encoding/decoding method is provided. An image decoding method of the present invention may comprise
(Continued)

deriving an intra-prediction mode of a current luma block, deriving an intra-prediction mode of a current chroma block based on the intra-prediction mode of the current luma block, generating a prediction block of the current chroma block based on the intra-prediction mode of the current chroma block, and the deriving of an intra-prediction mode of a current chroma block may comprise determining whether or not CCLM (Cross-Component Linear Mode) can be performed for the current chroma block.

18 Claims, 19 Drawing Sheets

(51) Int. Cl.
*H04N 19/159* (2014.01)
*H04N 19/176* (2014.01)
*H04N 19/186* (2014.01)

(58) Field of Classification Search
USPC .................................................. 375/240.02
See application file for complete search history.

(56) References Cited

U.S. PATENT DOCUMENTS

| | | | |
|---|---|---|---|
| 2015/0350640 A1* | 12/2015 | Jeong ................... | H04N 19/593 |
| | | | 375/240.12 |
| 2016/0044310 A1* | 2/2016 | Park ...................... | H04N 19/593 |
| | | | 375/240.12 |
| 2017/0272745 A1* | 9/2017 | Liu ....................... | H04N 19/157 |
| 2017/0366807 A1* | 12/2017 | Thoreau ................ | H04N 19/11 |
| 2018/0176587 A1* | 6/2018 | Panusopone .......... | H04N 19/63 |
| 2018/0205946 A1 | 7/2018 | Zhang et al. | |
| 2018/0220130 A1* | 8/2018 | Zhang ................... | H04N 19/86 |
| 2018/0300861 A1* | 10/2018 | Tsarenko .............. | G06T 15/02 |
| 2019/0141318 A1* | 5/2019 | Li .......................... | H04N 19/11 |
| 2019/0208201 A1* | 7/2019 | Yasugi .................. | H04N 19/105 |
| 2020/0007891 A1* | 1/2020 | Kang .................... | H04N 19/463 |
| 2020/0296417 A1* | 9/2020 | Ko ......................... | H04N 19/105 |

FOREIGN PATENT DOCUMENTS

| | | |
|---|---|---|
| KR | 101789478 B1 | 10/2017 |
| WO | 2001086962 A1 | 11/2001 |
| WO | 2012121535 A2 | 9/2012 |
| WO | 2013085282 A1 | 6/2013 |

* cited by examiner (a)                  (b)

luma block chroma block

VIDEO ENCODING/DECODING METHOD, APPARATUS, AND RECORDING MEDIUM HAVING BITSTREAM STORED THEREON

TECHNICAL FIELD

The present invention relates to a method and apparatus for encoding/decoding an image. Particularly, the present invention relates to a method and apparatus for encoding/decoding an image and signaling an intra prediction mode efficiently.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved encoding/decoding efficiency.

Another object of the present invention is to provide an image encoding/decoding method and apparatus for signaling an intra prediction mode efficiently.

Another object of the present invention is to provide a recording medium storing a bitstream generated by an image encoding method/apparatus of the present invention.

Another object of the present invention is to provide a recording medium storing a bitstream which is received, decoded and used by an image decoding apparatus according to the present invention to reconstruct an image.

Technical Solution

An image decoding method according to an embodiment of the present invention may comprise deriving an intra-prediction mode of a current luma block, deriving an intra-prediction mode of a current chroma block based on the intra-prediction mode of the current luma block, and generating a prediction block of the current chroma block based on the intra-prediction mode of the current chroma block, and the deriving of an intra-prediction mode of a current chroma block may comprise determining whether or not CCLM (Cross-Component Linear Mode) may be performed for the current chroma block.

In the image decoding method of the present invention, whether or not CCLM can be performed for the current chroma block may be determined on the basis of a size of the current luma block.

In the image decoding method of the present invention, when the current luma block has a predetermined size, it may be determined that CCLM can be performed for the current chroma block.

In the image decoding method of the present invention, when the current luma block is a 64×64 block, it may be determined that CCLM can be performed for the current chroma block.

In the image decoding method of the present invention, whether or not CCLM can be performed for the current chroma block may be determined on the basis of a size of a coding tree block.

In the image decoding method of the present invention, when the coding tree block is smaller than a 64×64 block, it may be determined that CCLM can be performed for the current chroma block.

In the image decoding method of the present invention, when an intra-prediction mode of the current chroma block is CCLM, a parameter of a linear model of the CCLM may be derived based on downsampled neighboring sample values obtained by downsampling a plurality of reconstructed neighboring samples of the current luma block.

In the image decoding method of the present invention, a parameter of a linear model of the CCLM may be derived based on a maximum value and a minimum value, which are derived from the downsampled neighboring sample values.

In the image decoding method of the present invention, the maximum value may be derived as an average of a first maximum value and a second maximum value among the downsampled neighboring sample values, and the minimum value may be derived as an average of a first minimum value and a second minimum value among the downsampled neighboring sample values.

In the image decoding method of the present invention, when an indicator showing whether or not an intra-prediction mode of the current luma block is a planar mode is a first value, a planar mode may be derived as an intra-prediction mode of the current luma block, and when the indicator is a second value, an MPM list of the current luma block may be configured and a mode indicated by an index for the MPM list may be derived as an intra-prediction mode of the current luma block.

An image encoding method according to another embodiment of the present invention may comprise determining an intra-prediction mode of a current luma block, determining an intra-prediction mode of a current chroma block, generating a prediction block of the current chroma block based on the intra-prediction mode of the current chroma block, and encoding the intra-prediction mode of the current chroma block based on the intra-prediction mode of the current luma block, and the determining of an intra-prediction mode of the current chroma block may comprise determining whether or not CCLM (Cross-Component Linear Mode) can be performed for the current chroma block.

In the image encoding method of the present invention, whether or not CCLM can be performed for the current chroma block may be determined on the basis of a size of the current luma block.

In the image encoding method of the present invention, when the current luma block has a predetermined size, it may be determined that CCLM can be performed for the current chroma block.

In the image encoding method of the present invention, when the current luma block is a 64×64 block, it may be determined that CCLM can be performed for the current chroma block.

In the image encoding method of the present invention, whether or not CCLM can be performed for the current chroma block may be determined on the basis of a size of a coding tree block.

In the image encoding method of the present invention, when the coding tree block is smaller than a 64×64 block, it may be determined that CCLM can be performed for the current chroma block.

In the image encoding method of the present invention, when an intra-prediction mode of the current chroma block is CCLM, a parameter of a linear model of the CCLM may be derived based on downsampled neighboring sample values obtained by downsampling a plurality of reconstructed neighboring samples of the current luma block.

In the image encoding method of the present invention, a parameter of a linear model of the CCLM may be derived based on a maximum value and a minimum value, which are derived from the downsampled neighboring sample values.

In the image encoding method of the present invention, the maximum value may be derived as an average of a first maximum value and a second maximum value among the downsampled neighboring sample values, and the minimum value may be derived as an average of a first minimum value and a second minimum value among the downsampled neighboring sample values.

A computer-readable recording medium according to another embodiment of the present invention may store a bitstream which is received, decoded and used to reconstruct an image by an image decoding apparatus. The bitstream may comprise information on an intra prediction mode of a current luma block and information on an intra prediction mode of a current chroma block, the information on the intra-prediction mode of the current luma block may be used to derive an intra-prediction mode of the current luma block, the intra-prediction mode of the current luma block and the information on the intra-prediction mode of the current chroma block may be used to derive an intra-prediction mode of the current chroma block, the intra-prediction mode of the current chroma block may be used to generate a prediction block of the current chroma block, and the intra-prediction mode of the current chroma block may be derived based on determining whether or not CCLM (Cross-Component Linear Mode) can be performed for the current chroma block.

A computer-readable recording medium according to another embodiment of the present invention may store a bitstream generated by an image encoding method and/or apparatus according to the present invention.

Advantageous Effects

According to the present invention, an image encoding/decoding method and apparatus with improved encoding/decoding efficiency may be provided.

Also, according to the present invention, an image encoding/decoding method and apparatus for signaling an intra prediction mode efficiently may be provided.

Also, according to the present invention, a recording medium storing a bitstream generated by an image encoding method/apparatus of the present invention may be provided.

Also, according to the present invention, a recording medium storing a bitstream which is received, decoded and used by an image decoding apparatus according to the present invention to reconstruct an image may be provided.

MODE FOR INVENTION

Figure 1:
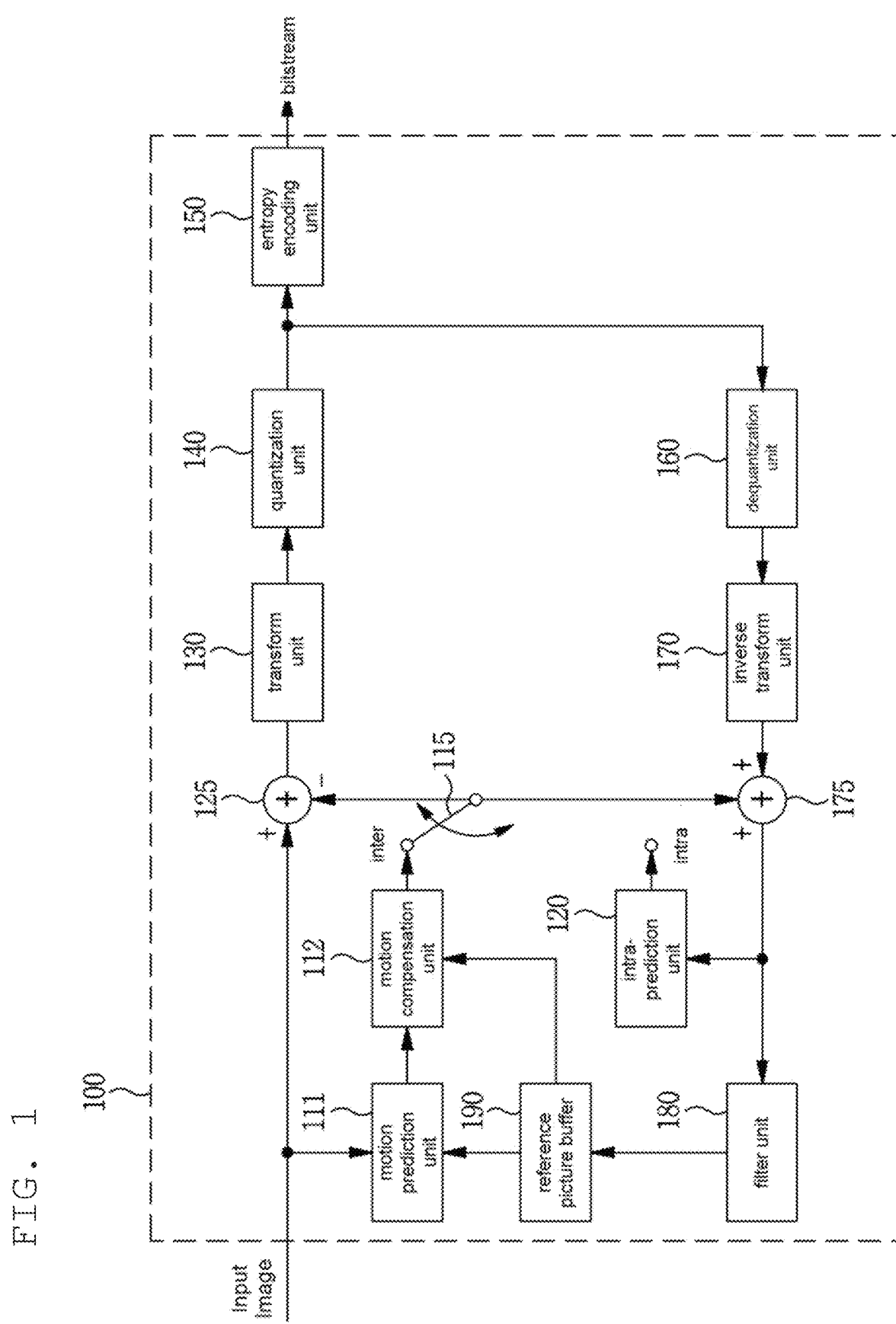
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction.

For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
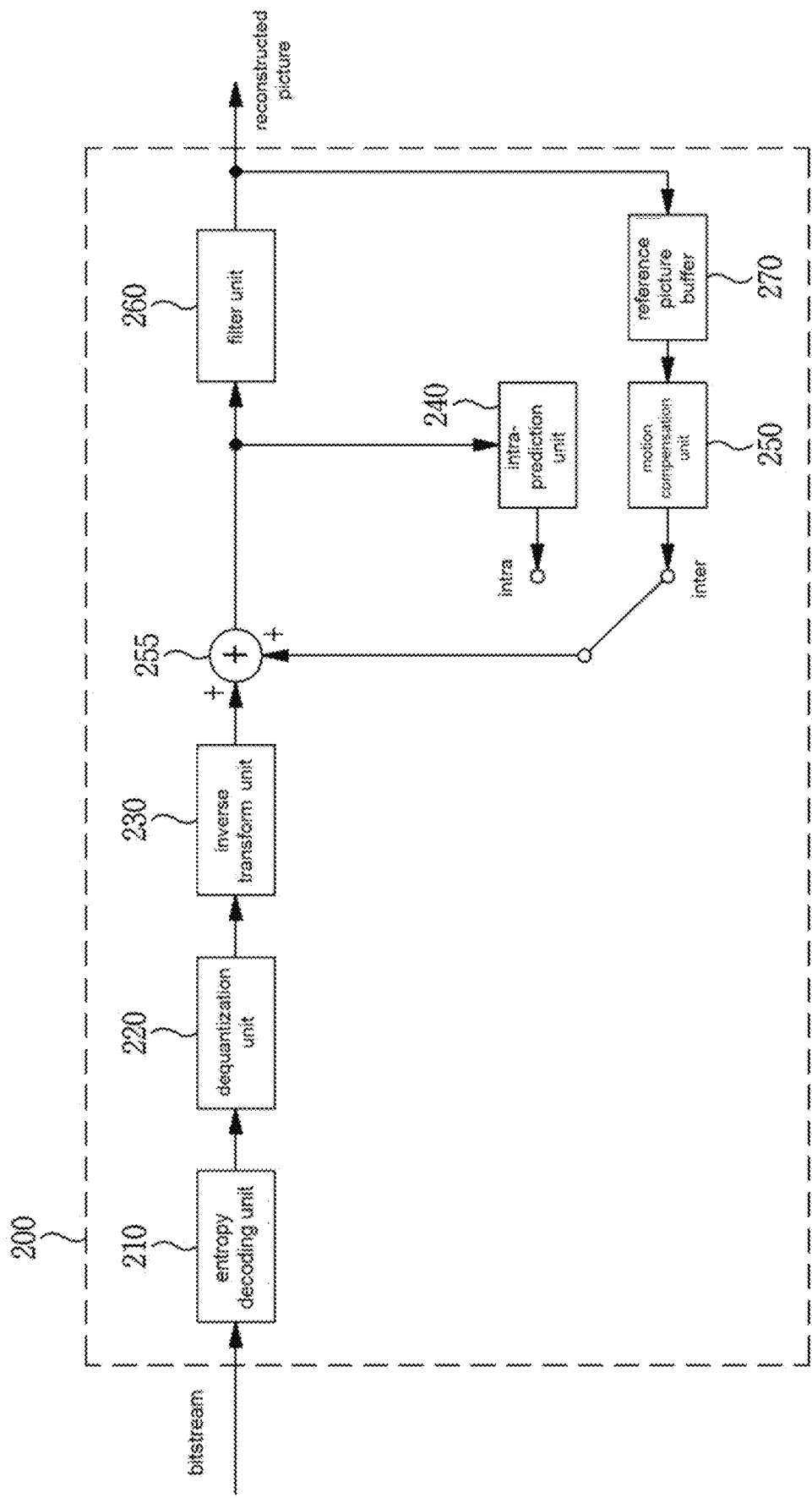
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 255 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
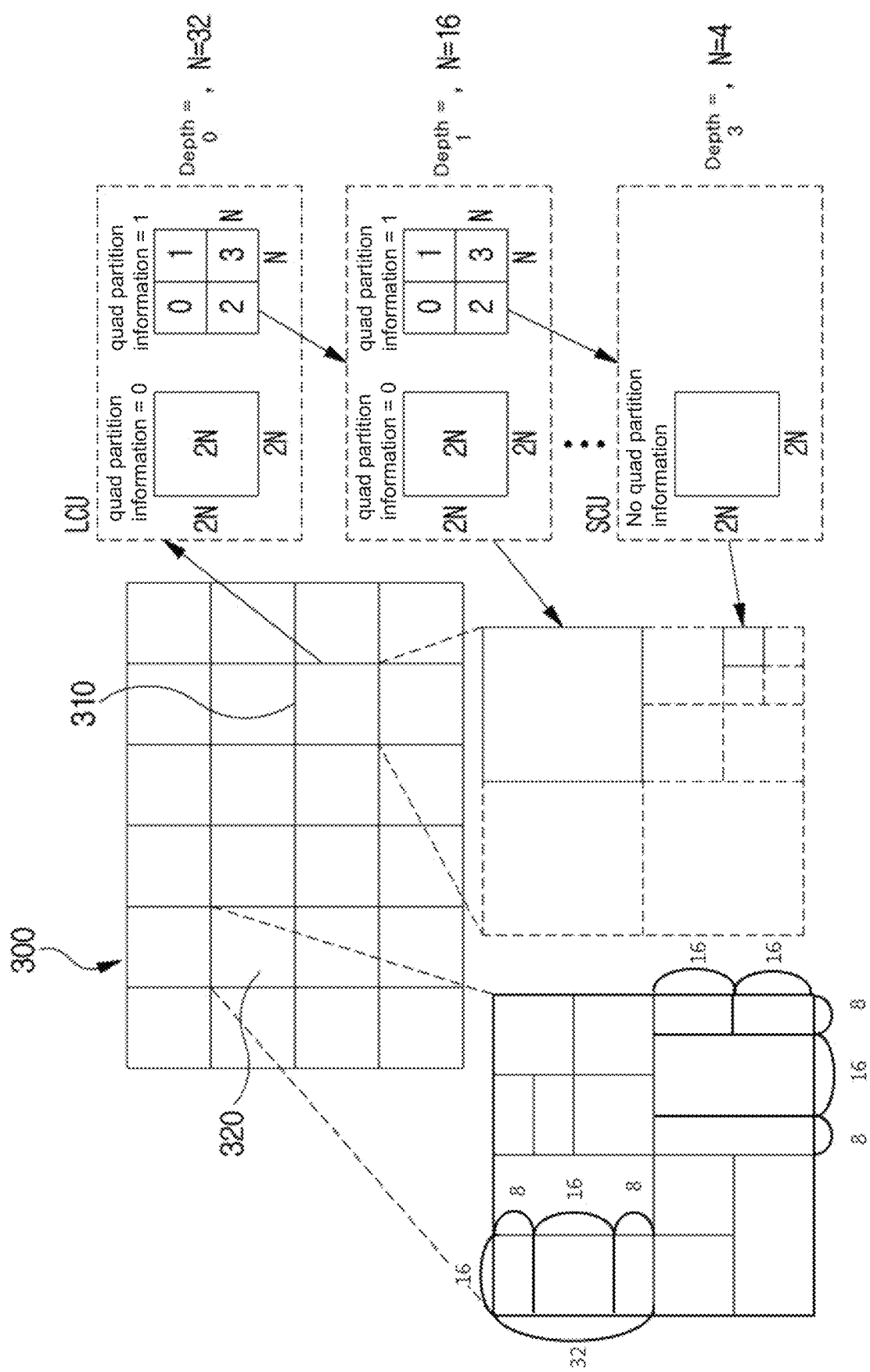
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be prohibited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be prohibited. The pipeline buffer size may be the size of the maximum transform block (e.g., 64×64). For example, when the pipeline buffer size is 64×64, the division below may be prohibited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
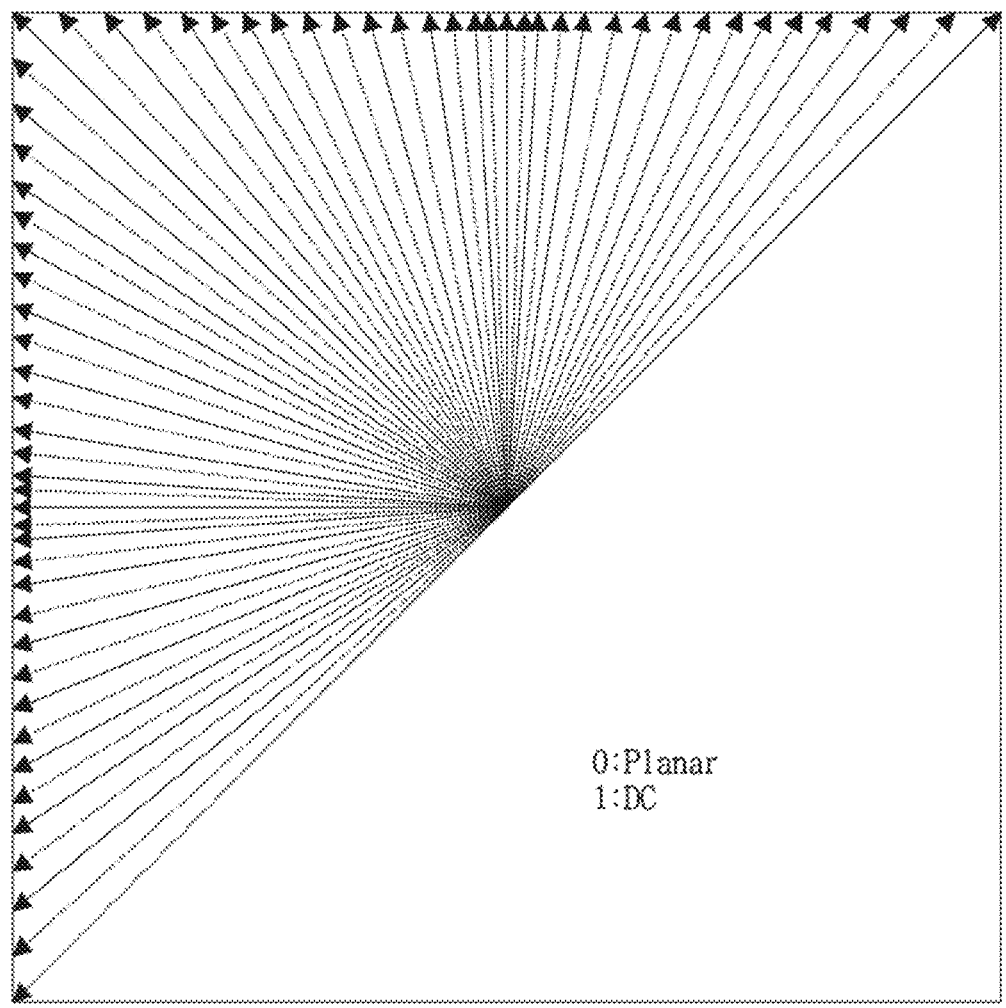
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
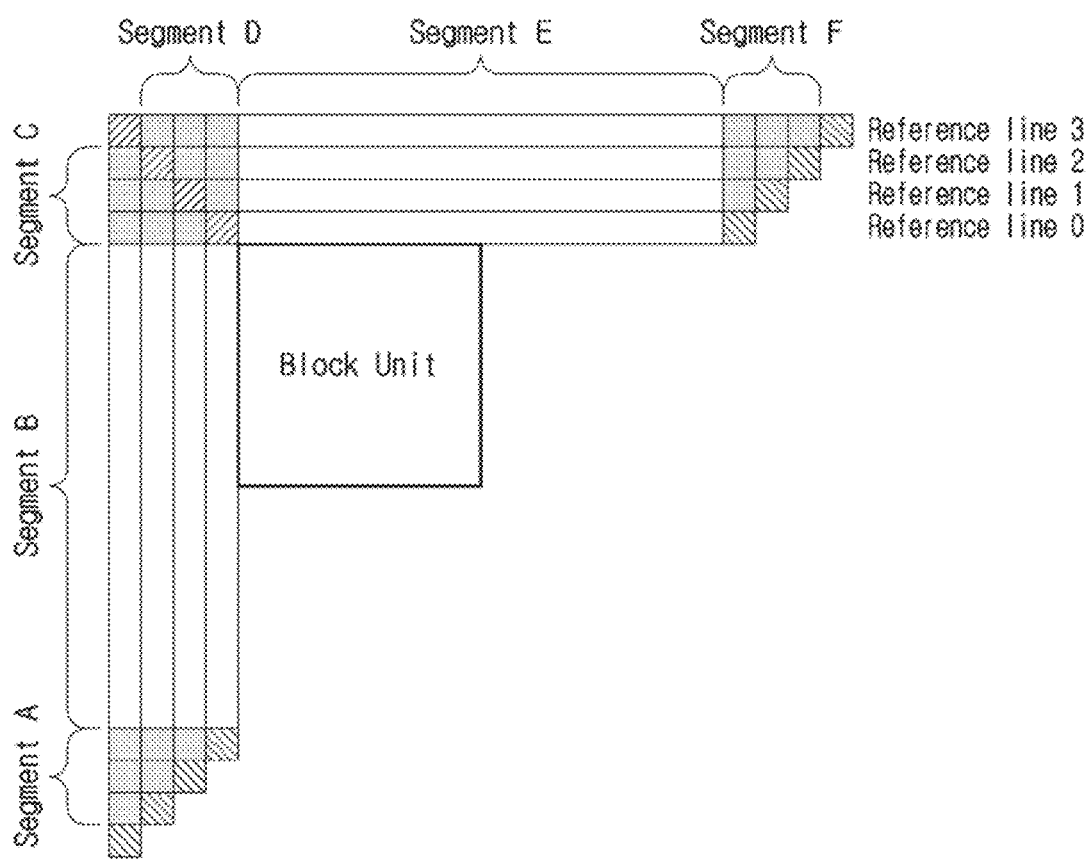
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
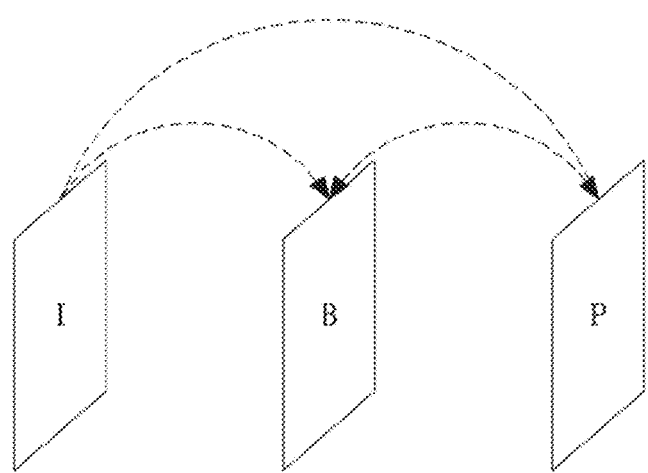
FIG. 5 is a diagram illustrating an embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
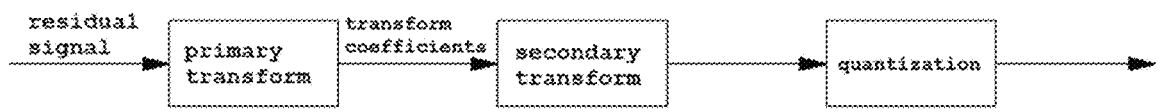
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loeve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, various embodiments of the present invention will be described with reference to the accompanying drawings.

An input image may be encoded/decoded by being partitioned into block units. Herein, a unit block of encoding/decoding may be CTU (Coding Tree Unit), CU (Coding Unit), TU (Transform Unit) or the like.

An image encoding apparatus may generate an MPM list and entropy encode information on an intra-prediction mode by using the generated MPM list. An image decoding apparatus may entropy decode information on an intra-prediction mode, generate an MPM list and then reconstruct the intra-prediction mode by using the decoded information and the MPM list.

In this specification, an image encoding apparatus may be called as an encoder. In addition, an image decoding apparatus may be called as a decoder.

Generation of MPM List

An encoder/decoder may generate a prediction block of a current block by using information on the current block and a neighboring block which is adjacent to the current block and has already been encoded/decoded. Information of a block used in this case may mean a pixel value of the block and/or a prediction mode (intra-prediction mode) of the block.

A neighboring block adjacent to a current block may mean at least one among an upper block, a lower block, a left block, a right block, an upper left block, an upper right block and a lower left block, which are separated by n pixels from the boundary of the current block. n may be 0 or any positive integer.

As shown in FIG. 7, a plurality of (for example, N) reference sample lines (reference lines) may be referred to for predicting a current block. A prediction block of a current block may be generated by selecting at least one among a plurality of reference sample lines. N may be any positive integer. A reference sample line may be a set of samples, which are at an equal distance from a current block, among adjacent neighboring blocks. Information on which reference sample is used in each reference sample line may be signaled, and an index restoring the corresponding information may be IntraLumaRefLineIdx.

For example, when IntraLumaRefLineIdx is a first value (for example, 0), a set of samples that are distant one pixel from a current block, that is, a first reference sample line (Reference line 0) may be indicated. Similarly, when IntraLumaRefLineIdz is a second value (for example, 1), a second reference sample line (Reference line 1) may be indicated. When IntraLumaRefLineIdx is a third value (for example, 2), a third reference sample line (Reference line 2) may be indicated. When IntraLumaRefLineIdx is N-th value (for example, N−1), an N-th reference sample line may be indicated.

There is a high probability that an intra-prediction mode of a current block is identical to an intra-prediction mode of an adjacent neighboring block. Accordingly, an intra-prediction mode of a current block may be determined, encoded or decoded by using an intra-prediction mode of a neighboring block. An encoder/decoder may derive an MPM (Most Probable Mode) candidate mode, which has a high probability of being identical to an intra-prediction mode of a current block, based on an intra-prediction mode of a neighboring block. A derived MPM candidate mode may be included in an MPM list. An encoder/decoder may configure an MPM list according to each reference sample line used for prediction.

Intra prediction of a current block may be performed by combining reference samples that are located in a direction indicated by an intra-prediction mode of the current block.

For example, when an intra-prediction mode of a current block is a diagonal mode, a prediction sample of the current block may be generated by combining samples of a neighboring block that is located in the corresponding diagonal direction. For example, when an intra-prediction mode of a current block is a vertical mode, a prediction sample of the current block may be generated by combining samples of a neighboring block that is located above. For example, when an intra-prediction mode of a current block is a horizontal mode, a prediction sample of the current block may be generated by combining samples of a neighboring block that is located left.

When an intra-prediction mode of a current block is a non-directional mode, a prediction sample of the current block may be generated by combining one or more samples of a neighboring block.

A prediction mode of a current block may be generated by combining a sample of a neighboring block and a predetermined matrix or vector. For combination with a matrix or vector, the size of a neighboring block may be increased or decreased. A matrix or vector may be configured by using at least one of the size of a current block and an intra-prediction mode of the current block.

For example, the size of a neighboring block may be reduced to 2×2, 4×4 or 8×8. An average value of samples of a neighboring block may be used to reduce the size of the neighboring block. However, instead of an average value, a different statistic value described in this specification may be used.

A matrix or vector for generating a prediction block of a current block may be configured based on the size of the current block and/or an intra-prediction mode of the current block.

For example, when an intra-prediction mode of a current block is a non-directional mode and the current block is at least one of 4×4 block, 4×8 block, 8×4 block and 8×8 block, a matrix or vector may be configured.

Alternatively, when an intra-prediction mode of a current block is a directional mode and the current block is at least one of 4×4 block, 4×8 block, 8×4 block and 8×8 block, a matrix or vector may be configured.

Alternatively, when a current block is larger than 8×8 block and an intra-prediction mode of the current block is a non-directional mode, a matrix or vector may be configured.

On the other hand, when a current block is larger than 8×8 block and an intra-prediction mode of the current block is a directional mode, a matrix or vector may be configured.

In order to generate an intra-prediction block of a current block, an interpolation filter may be adaptively used based on the position of a prediction target sample of the current block.

Figure 8:
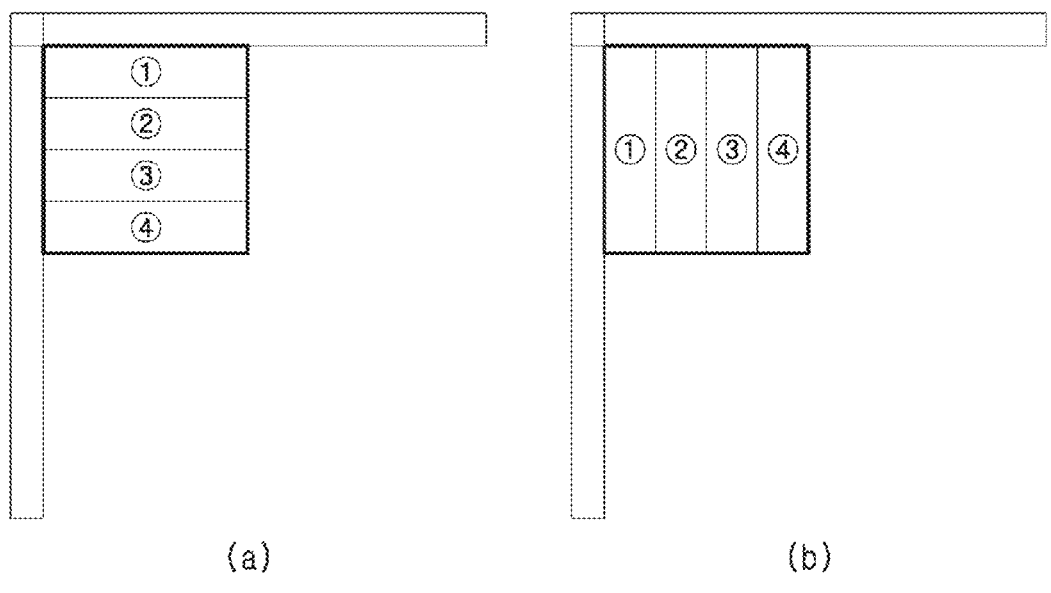
FIG. 8 is a view showing an embodiment where intra prediction is performed by partitioning a current block.

FIG. 8 is a view showing an embodiment where intra prediction is performed by partitioning a current block.

As shown in FIG. 8, a current block may be partitioned into at least one or more sub-blocks. Here, partitioning of a current block may be performed in at least one direction among horizontal, vertical, diagonal and inverse diagonal directions.

Intra prediction may be performed for each sub-block that is generated by partitioning. As shown in FIG. 8A, a current block may be partitioned in the horizontal direction to generate four sub-blocks. In this case, intra prediction may be performed from top to bottom, for example, from sub-block 1 to sub-block 4 sequentially. Alternatively, intra prediction may be performed from bottom to top, for example, from sub-block 4 to sub-block 1 sequentially.

Intra prediction may be performed by using samples adjacent to an intra-prediction target block. In the example illustrated by FIG. 8A, when intra prediction is performed from top to bottom, intra prediction for sub-block 1 may be performed by using a sample of the upper neighboring block and a sample of the left neighboring block. In addition, intra prediction for sub-block 2 may be performed by using a sample of the upper neighboring block, a sample of the left neighboring block and a sample of the reconstructed sub-block 1. Thus, intra prediction for a current sub-block may be performed by using at least one among a sample of the upper neighboring block, a sample of the left neighboring block, and a sample of a reconstructed neighboring sub-block.

As shown in FIG. 8B, a current block may be partitioned in the vertical direction to generate four sub-blocks. In this case, intra prediction may be performed from left to right, for example, from sub-block 1 to sub-block 4 sequentially. Alternatively, intra prediction may be performed from right to left, for example, from sub-block 4 to sub-block 1 sequentially. As explained for FIG. 8A, intra prediction for a current sub-block may be performed by using at least one among a sample of the upper neighboring block, a sample of the left neighboring block, and a sample of a reconstructed neighboring sub-block.

Figure 9:
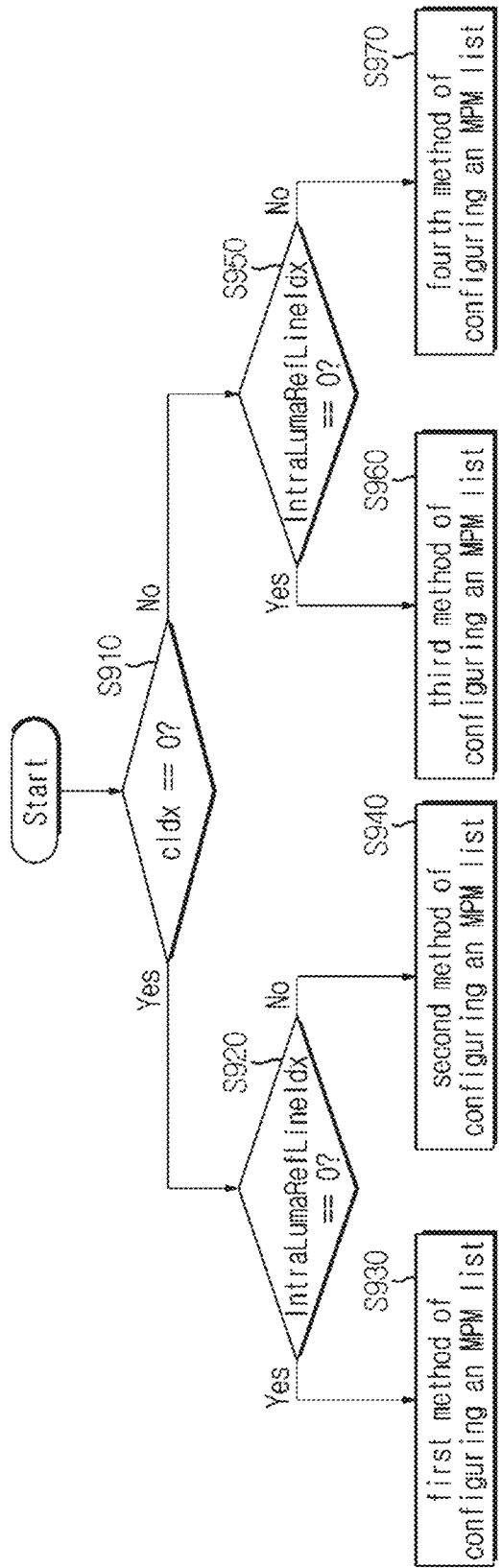
FIG. 9 is a view for explaining a method of configuring an MPM list according to an embodiment of this invention.

FIG. 9 is a view for explaining a method of configuring an MPM list according to an embodiment of this invention.

An encoder/decoder may determine a method of configuring an MPM list on the basis of at least one of a component of a current block and a reference sample line index. A component of a current block may be expressed as cIdx. When cIdx has a first value, it may mean a luma component. When cIdx has a second value, it may mean a chroma component.

An intra-prediction mode of a chroma block may be one among a planar mode, a DC mode, a horizontal mode, a vertical mode, a vertical-diagonal mode, a direct mode (DM) and a linear mode (LM). Mode values of a planar mode, a DC mode and a horizontal mode may be expressed as 0, 1 and 18 respectively. Mode values of a vertical mode and a vertical-diagonal mode may be expressed as 50 and 66 respectively. A mode value of a LM may be expressed as 81, 82 or 83.

Information concerning linear mode (LM) prediction may be signaled at a higher level. For example, information indicating whether a linear mode (LM) is available (for example, cclm_enabled_flag) may be signaled at a higher level of a block. For example, the value of cclm_enabled_flag may be determined at a higher level like a sequence, a picture, a slice, a tile, and a CTU. When cclm_enabled_flag is a first value, it may mean that LM is not available. When cclm_enabled_flag is a second value, it may mean that LM is available.

For example, if a component of a current block is a luma component (Yes at S910) and 0-th reference sample line is used (Yes at S920), a first method of configuring an MPM list may be used. When the first method of configuring an MPM list is used, the method of configuring an MPM list, which is explained with reference to FIG. 10, FIG. 16, FIG. 17 and FIG. 18, may be used.

For example, if a component of a current block is a luma component (Yes at S910) and a reference sample line other than the 0-th reference sample line is used (No at S920), a second method of configuring an MPM list may be used. When the second method of configuring an MPM list is used, the method of configuring an MPM list, which is explained with reference to FIG. 11 to FIG. 18, may be used.

For example, if a component of a current block is a chroma component (No at S910) and LM is not available (Yes at S950), a third method of configuring an MPM list may be used. When the third method of configuring an MPM list is used, the method of configuring an MPM list, which is explained with reference to Table. 1, may be used.

For example, if a component of a current block is a chroma component (No at S910) and LM is available (No at S950), a fourth method of configuring an MPM list may be used. When the fourth method of configuring an MPM list is used, the method of configuring an MPM list, which is explained with reference to Table 2, may be used.

In the above embodiment, a first value may mean 0 and a second value may mean 1.

In an embodiment described in this specification, an encoder/decoder may derive an MPM candidate mode from an intra-prediction mode of a neighboring block adjacent to a current block. Among intra-prediction modes of neighboring blocks, a first prediction mode may be indicated by candIntraPredModeA, and a second prediction mode may be indicated by candIntraPredModeB. When an intra-prediction of a neighboring block is not available, either candIntraPredModeA or candIntraPredModeB may be set as a planar mode.

For example, a first prediction mode may be an intra-prediction mode of a left neighboring block, and a second prediction mode may be an intra-prediction mode of an upper neighboring block. Alternatively, a first prediction mode may be an intra-prediction mode of an upper-right neighboring block, and a second prediction mode may be an intra-prediction mode of a lower-left neighboring block.

An encoder/decoder may generate an MPM list by using derived MPM candidate modes. Generating an MPM list may mean adding or including an MPM candidate mode in an MPM list.

Figure 10:
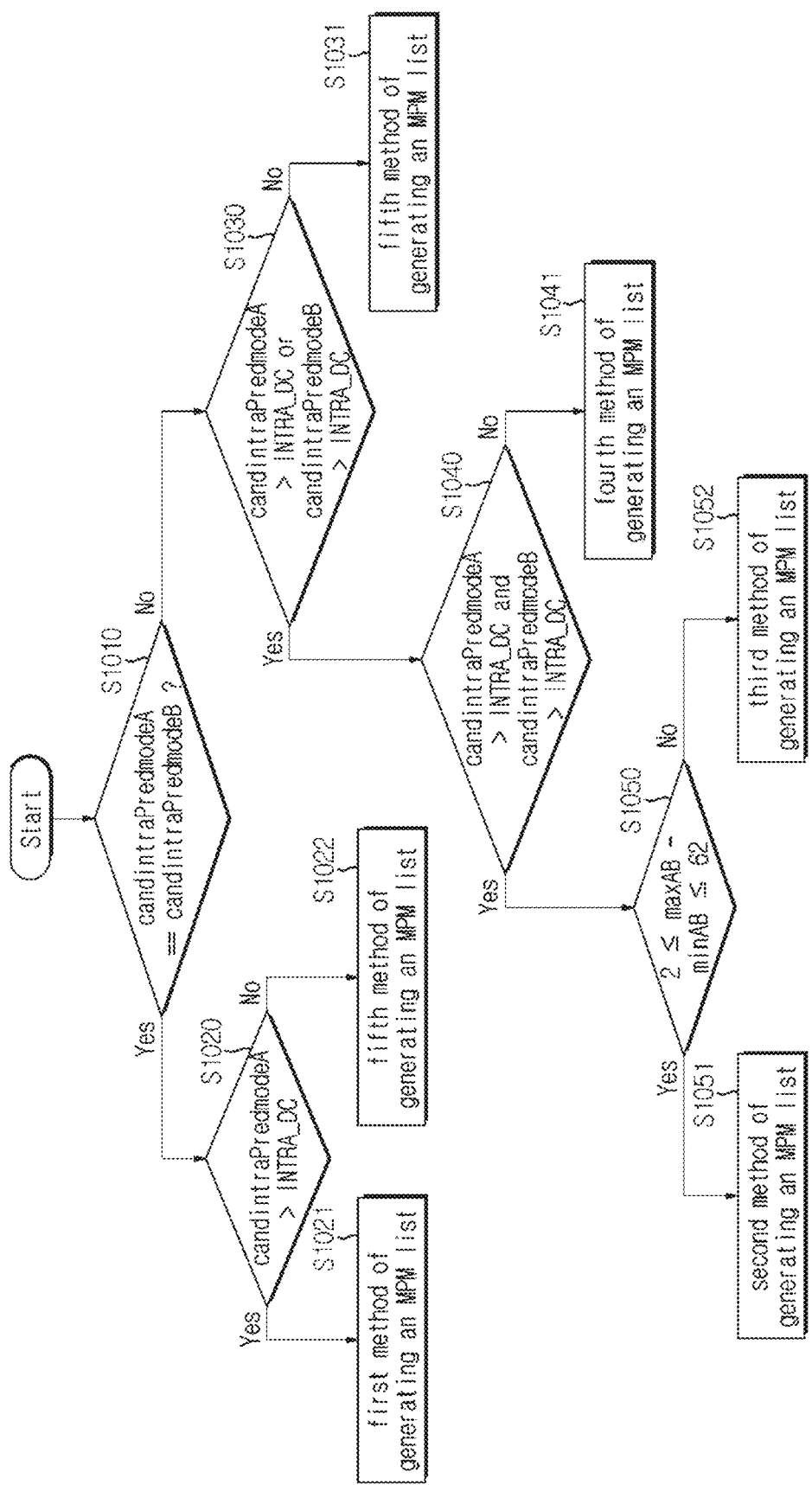
FIG. 10 is a view for explaining an example of configuring an MPM list.

FIG. 10 is a view for explaining an example of configuring an MPM list.

The method of configuring an MPM list in FIG. 10 may be used when, for example, a current block is a luma block and 0-th reference line is used.

For example, when a first prediction mode is identical with a second prediction mode (Yes at S1010) and the corresponding prediction mode (the first prediction mode) is a directional mode (Yes at S1020), a first method of generating an MPM list may be used (S1021).

For example, according to the first method of generating an MPM list, at least one among the corresponding prediction mode (a first prediction mode), a planar mode and a DC mode that are non-directional modes, may be included in an MPM list. In addition, at least one among prediction modes adjacent to the corresponding prediction mode (a first prediction mode) may be included in an MPM list.

In this specification, an adjacent prediction mode may mean a mode corresponding to a result obtained by adding the offset n to or subtracting the offset n from a particular prediction mode value. Herein, the offset n may be a positive integer and be smaller than a particular value m. The offset n, for example, may be 1 or 2.

For example, according to the first method of generating an MPM list, an MPM list may include at least one among a first prediction mode, a planar mode, a DC mode, a (first prediction mode−1) mode, a (first prediction mode+1) mode, and a (first prediction mode−2) mode. Here, when a mode adjacent to a first prediction mode or a second prediction mode is a non-directional mode, at least one among directional modes that are located in an opposite direction may be included in an MPM list.

In this specification, minAB may mean a mode with a smaller value between a first prediction mode and a second prediction mode. In addition, maxAB may mean a mode with a larger value between a first prediction mode and a second prediction mode.

For example, when a first prediction mode is identical with a second prediction mode (Yes at S1010) and the corresponding prediction mode (the first prediction mode) is a non-directional mode (No at S1020), a fifth method of generating an MPM list may be used (S1022).

For example, according to the fifth method of generating an MPM list, the corresponding prediction mode (a first prediction mode) may be included in an MPM list. In addition, when the corresponding prediction mode (a first prediction mode) is a planar mode, a DC mode may be included in an MPM list. In addition, when the corresponding prediction mode (a first prediction mode) is a DC mode, a planar mode may be included in an MPM list. In addition, an MPM list may include at least one among a vertical mode, a horizontal mode, a (vertical−4) mode, and a (vertical+4) mode. A vertical mode may have a value of 50, a horizontal mode may have a value of 18, a (vertical−4) mode may have a value of 46, and a (vertical+4) mode may have a value of 54.

For example, when a first prediction mode is different from a second prediction mode (No at S1010) and both the first prediction mode and the second prediction mode are a non-directional mode (Yes at S1030, Yes at S1040), a difference value between the first prediction mode and the second prediction mode (maxAB−minAB) is calculated, and it may be confirmed whether the difference value is within a predetermined range (for example, from 2 to 62) (S1050). If the difference value is within a predetermined range (Yes at S1050), a second method of generating an MPM list may be used (S1051).

For example, according to the second method of generating an MPM list, at least one of a first prediction mode and a second prediction mode may be included in an MPM list. In addition, at least one of a planar mode that is a non-directional mode and a DC mode may be included in an MPM list. In addition, at least one among prediction modes adjacent to a maxAB mode may be included in an MPM list.

For example, at S1040, if a difference value (maxAB−minAB) between a first prediction mode and a second prediction mode is not within a predetermined range (for example, from 2 to 62) (No at S1050), a third method of generating an MPM list may be used (S1052).

For example, according to the third method of generating an MPM list, at least one of an adjacent mode of a maxAB mode and an adjacent mode of a minAB mode may be included in an MPM list.

For example, an MPM list generated according to the third method of generating an MPM list may include at least one among a first prediction mode, a second prediction mode, a planar mode, a DC mode, a (maxAB−2) mode and a (maxAB+2) mode.

For example, when a first prediction mode is different from a second prediction mode (No at S1010), at least one of the two modes is a directional mode (Yes at S1030) and one of the two modes is a non-directional mode (No at S1040), a fourth method of generating an MPM list may be used (S1041).

For example, according to the fourth method of generating an MPM list, an MPM list may include at least one of a first prediction mode and a second prediction mode. In addition, when a non-directional mode included in an MPM list is a planar mode, a DC mode may be included in an MPM list. In addition, when a non-directional mode included in an MPM list is a DC mode, a planar mode may be included in an MPM list. In addition, at least one among adjacent modes of a non-directional mode included in an MPM list may be included in the MPM list.

For example, according to the fourth method of generating an MPM list, when a first prediction mode is a planar mode and a second prediction mode is a directional mode, an MPM list may include at least one of a planar mode and a second prediction mode. In addition, an MPM list may include at least one of a DC mode and a mode adjacent to a maxAB mode. An adjacent mode of a maxAB mode may be at least one among a (maxAB−1) mode, a (maxAB+1) mode and a (maxAB−2) mode. When an adjacent mode of a second prediction mode is a non-directional mode, at least one among directional modes located in an opposite direction may be included in an MPM list. Herein, a second prediction mode may mean a maxAB mode.

For example, when a first prediction mode is different from a second prediction mode (No at S1010) and both modes are non-directional modes (No at S1030), a fifth method of generating an MPM list may be used (S1031).

For example, according to the fifth method of generating an MPM list, an MPM list may include at least one of a first prediction mode and a second prediction mode. In addition, an MPM list may include at least one among a vertical mode, a horizontal mode, a (vertical mode−4) mode, and a (vertical mode+4) mode. A vertical mode may have a value of 50, a horizontal mode may have a value of 18, a (vertical mode−4) mode may have a value of 46, and a (vertical mode+4) mode may have a value of 54. For example, a first prediction mode may be a planar mode, and a second prediction mode may be a DC mode.

For example, when one of a first prediction mode and a second prediction mode is a directional mode and the other is a non-directional mode, a mode with a larger value (maxAB) between the first prediction mode and the second prediction mode may be determined as a directional mode. Alternatively, a mode with a smaller value (minAB) between a first prediction mode and a second prediction mode may be determined as a non-directional mode.

For example, in the fourth method of generating an MPM list, a mode with a larger value (maxAB) between two modes may be determined as a directional mode.

Figure 11:
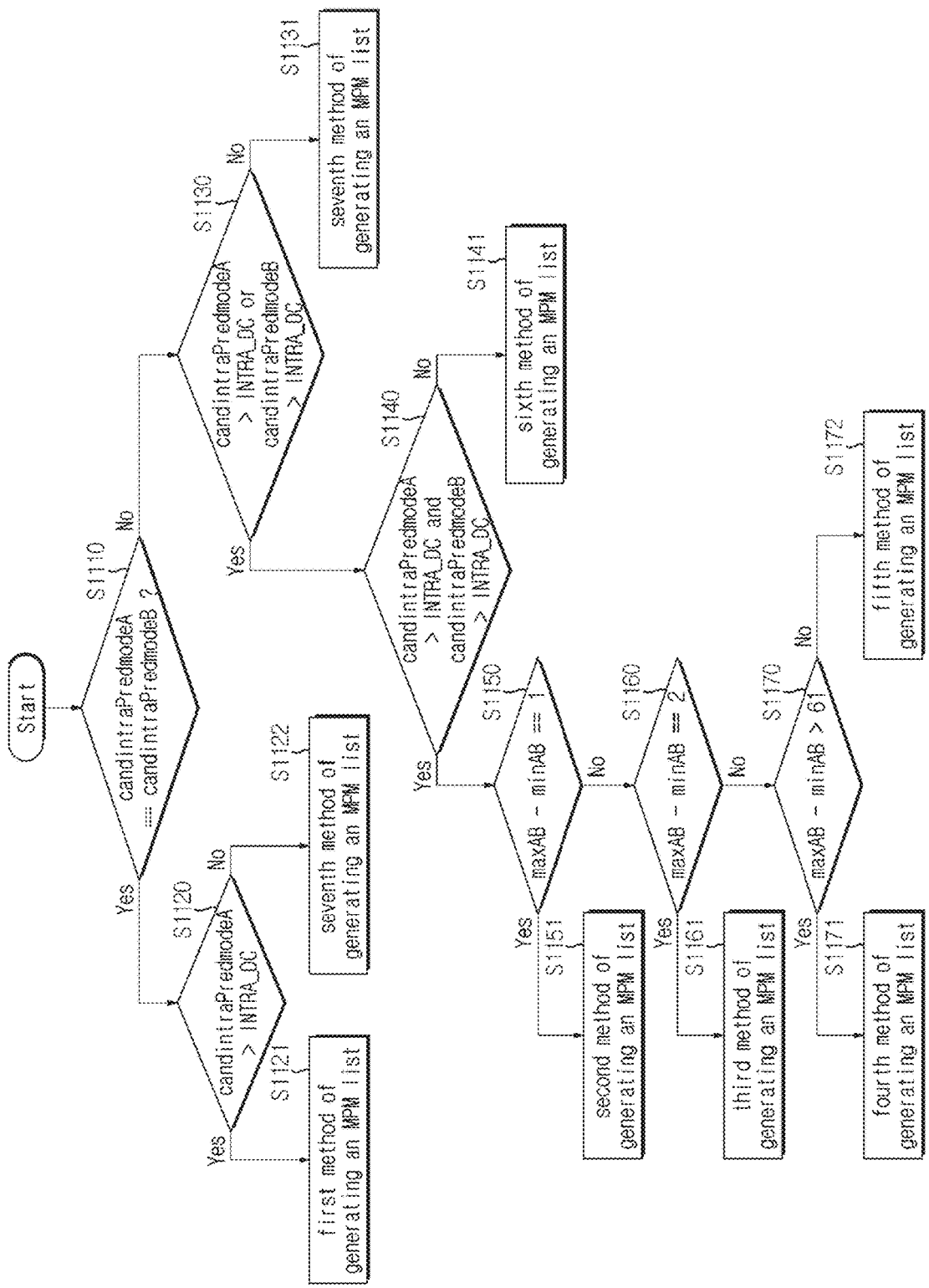
FIG. 11 is a view for explaining another example of configuring an MPM list.

FIG. 11 is a view for explaining another example of configuring an MPM list.

The method of configuring an MPM list in FIG. 11 may be used when, for example, a current block is a luma block and a 0-th or higher reference line is used.

Herein, an MPM list may include only a directional mode and/or a DC mode. In addition, an MPM list may not include a planar mode.

In addition, an MPM list may consist of unique intra-prediction modes that are not duplicated with each other.

For example, when a first prediction mode is identical with a second prediction mode (Yes at S1110) and the corresponding prediction mode (the first prediction mode) is a directional mode (Yes at S1120), a first method of generating an MPM list may be used (S1121).

For example, according to the first method of generating an MPM list, at least one of the corresponding prediction mode (a first prediction mode) and an adjacent mode of the corresponding prediction mode may be included the MPM list.

For example, according to the first method of generating an MPM list, an MPM list may include at least one among a first prediction mode, a (first prediction mode−1) mode, a (first prediction mode+1) mode, a (first prediction mode−2) mode, a (first prediction mode+2) mode, and a (first prediction mode−3) mode. In this case, among the modes, only N modes may be included. Here, N may be a positive integer and be 5. Here, when a mode adjacent to a first prediction mode or a second prediction mode is a non-directional mode, at least one among directional modes that are located in an opposite direction may be included in an MPM list.

For example, when a first prediction mode is identical with a second prediction mode (Yes at S1110) and the corresponding prediction mode (the first prediction mode) is a non-directional mode (No at S1120), a seventh method of generating an MPM list may be used (S1122).

For example, according to the seventh method of generating an MPM list, at least one among a DC mode, a vertical mode, a horizontal mode, a (vertical mode−4) mode, and a (vertical mode+4) mode may be included in an MPM list. In this case, among the modes, only N modes may be included. Here, N may be a positive integer and be 5. A DC mode may have a value of 1, a vertical mode may have a value of 50, a horizontal mode may have a value of 18, a (vertical mode−4) mode may have a value of 46, and a (vertical mode+4) mode may have a value of 54. An MPM list generated according to the seventh method of generating an MPM list may include at least one among the modes.

For example, when a first prediction mode is different from a second prediction mode (No at S1110) and both prediction modes are directional modes (Yes at S1130, Yes at S1140), an MPM list may include at least one of a first prediction mode and a second prediction mode. In addition, a difference value (maxAB−minAB) between two prediction modes may be obtained. If the difference value is 1 (Yes at S1150), a second method of generating an MPM list may be used (S1151).

For example, according to the second method of generating an MPM list, an MPM list may include at least one of an adjacent mode of a maxAB mode and an adjacent mode of a minAB mode.

For example, according to the second method of generating an MPM list, an MPM list may include at least one among a first prediction mode, a second prediction mode, a (minAB−1) mode, a (maxAB+1) mode, a (minAB−2) mode and a (maxAB+2) mode. In this case, among the modes, only N modes may be included. Here, N may be a positive integer and be 5.

For example, when the difference value (maxAB−minAB) between two prediction modes is 2 (Yes at S1160), a third method of generating an MPM list may be used (S1161).

According to the third method of generating an MPM list, at least one of an adjacent mode of a minAB mode and an adjacent mode of a maxAB mode may be included in an MPM list.

For example, according to the third method of generating an MPM list, an MPM list may include at least one among a first prediction mode, a second prediction mode, a (minAB+1) mode, a (minAB−1) mode, a (maxAB+1) mode and a (minAB−2) mode. In this case, among the modes, only N modes may be included. Here, N may be a positive integer and be 5.

For example, when a difference value between two prediction modes (maxAB−minAB) is 62 or more (Yes at S1170), a fourth method of generating an MPM list may be used (S1171).

According to the fourth method of generating an MPM list, at least one of an adjacent mode of a maxAB mode and an adjacent mode of a minAB mode may be included in an MPM list.

For example, according to the fourth method of generating an MPM list, an MPM list may include at least one among a first prediction mode, a second prediction mode, a (minAB+1) mode, a (maxAB−1) mode, a (minAB+2) mode and a (maxAB−2) mode. In this case, among the modes, only N modes may be included. Here, N may be a positive integer and be 5.

For example, when a difference value between two prediction modes (maxAB−minAB) is 3 or more and 61 or less (No at S1170), a fifth method of generating an MPM list may be used (S1172).

According to the fifth method of generating an MPM list, at least one of an adjacent mode of a maxAB mode and an adjacent mode of a minAB mode may be included in an MPM list.

For example, according to the fifth method of generating an MPM list, an MPM list may include at least one among a first prediction mode, a second prediction mode, a (minAB−1) mode, a (minAB+1) mode, a (maxAB−1) mode and a (maxAB+1) mode. In this case, among the modes, only N modes may be included. Here, N may be a positive integer and be 5.

For example, when a first prediction mode is different from a second prediction mode (No at S1110) and only one of the two modes is a directional mode (Yes at S1130, No at S1140), a sixth method of generating an MPM list may be used (S1141).

According to the sixth method of generating an MPM list, a directional mode among a first prediction mode and a second prediction mode may be included in an MPM list. In addition, at least one among adjacent modes of an included directional mode may be included in an MPM list.

For example, according to the sixth method of generating an MPM list, when a first prediction mode is a non-directional mode and a second prediction mode is a directional mode, an MPM list may include a second prediction mode. Here, the one with a larger value between a first prediction mode and a second prediction mode may be determined as a directional mode, and an MPM list may include at least one among a (maxAB−1) mode, a (maxAB+1) mode, a (maxAB−2) mode, a (maxAB+2) mode and a (maxAB−3) mode. In this case, among the modes, only N modes may be included. Here, N may be a positive integer and be 5. Herein, when an adjacent mode of a second prediction mode is a non-directional mode, at least one among directional modes located in an opposite direction may be included in an MPM list.

For example, when a first prediction mode is different from a second prediction mode (No at S1110) and both modes are non-directional modes (No at S1130), a seventh method of generating an MPM list may be used (S1131).

For example, according to the seventh method of generating an MPM list, at least one among a DC mode, a vertical mode, a horizontal mode, a (vertical mode−4) mode, and a (vertical mode+4) mode may be included in an MPM list. In this case, among the modes, only N modes may be included. Here, N may be a positive integer and be 5. Herein, a DC mode may have a value of 1, a vertical mode may have a value of 50, a horizontal mode may have a value of 18, a (vertical mode−4) mode may have a value of 46, and a (vertical mode+4) mode may have a value of 54. According to the seventh method of generating an MPM list, an MPM list may include at least one among the modes.

In this specification, when at least one of a first prediction mode and a second prediction mode is a directional mode and the other is a non-directional mode, the determination whether a mode is a directional mode or a non-directional mode may be based on the comparison of mode values. For example, a mode with a larger mode value may be determined as a directional mode.

Figure 12:
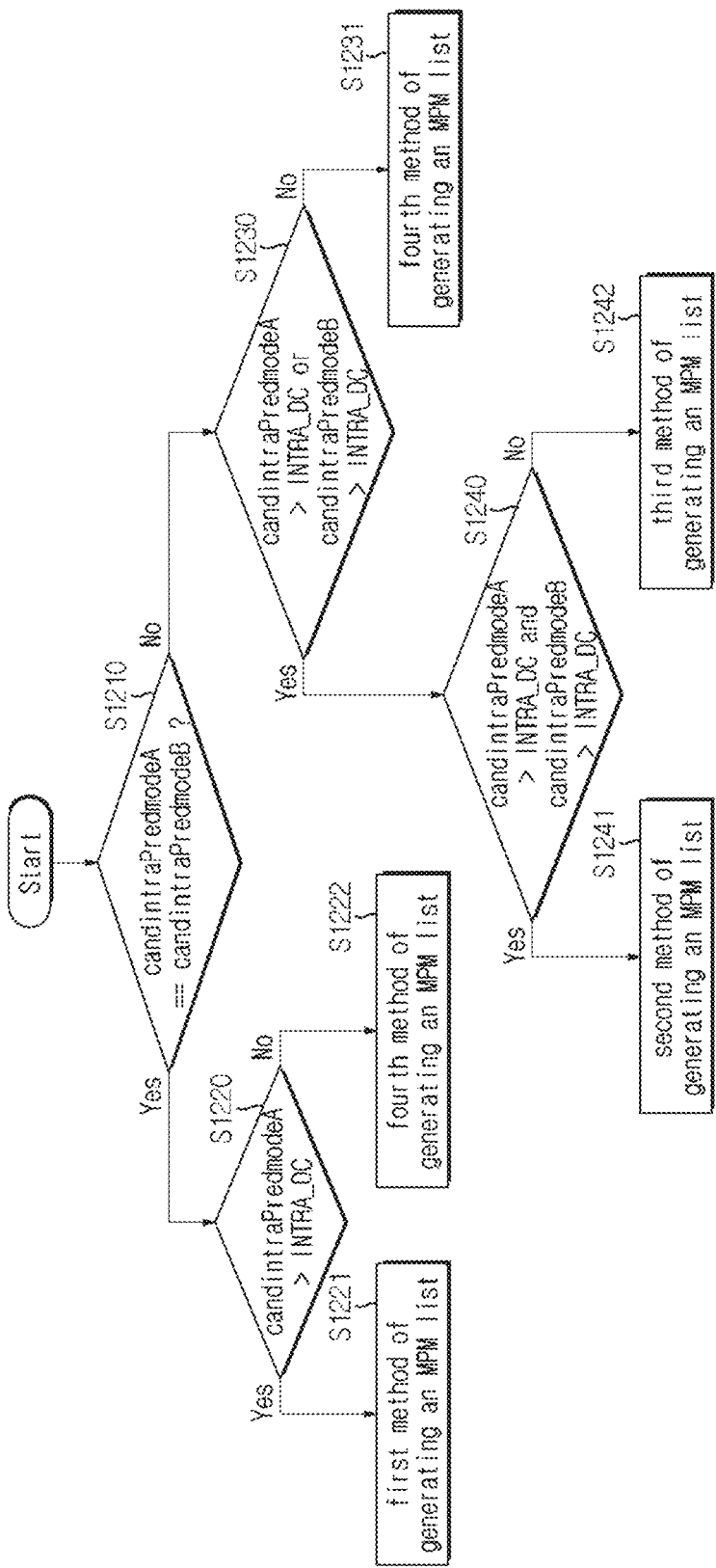
FIG. 12 is a view for explaining another example of configuring an MPM list.

FIG. 12 is a view for explaining another example of configuring an MPM list.

The method of configuring an MPM list in FIG. 12 may be used when, for example, a current block is a luma block and a 0-th or higher reference line is used.

Herein, an MPM list may include only a directional mode and/or a DC mode.

For example, when a first prediction mode is identical with a second prediction mode (Yes at S1210) and the corresponding prediction mode (a first prediction mode) is a directional mode (Yes at S1220), a first method of generating an MPM list may be used (S1221).

For example, according to the first method of generating an MPM list, the corresponding prediction mode (a first prediction mode) may be included in an MPM list. In addition, at least one among adjacent modes of the corresponding prediction mode may be included in an MPM list.

For example, according to the first method of generating an MPM list, an MPM list may include at least one among a first prediction mode, a (first prediction mode−1) mode, a (first prediction mode+1) mode, a (first prediction mode−2) mode, a (first prediction mode+2) mode, and a (first prediction mode−3) mode. Herein, when an adjacent mode of a first prediction mode is a non-directional mode, at least one among directional modes located in an opposite direction may be included in an MPM list.

For example, when a first prediction mode is identical with a second prediction mode (Yes at S1210) and the corresponding prediction mode (a first prediction mode) is a non-directional mode (No at S1220), a fourth method of generating an MPM list may be used (S1222).

For example, according to the fourth method of generating an MPM list, at least one among a vertical mode, a horizontal mode, a horizontal-diagonal mode, a diagonal mode, a vertical-diagonal mode and mode 26 may be included in an MPM list.

For example, when a first prediction mode is different from a second prediction mode (No at S1210) and both modes are directional modes (Yes at S1230, Yes at S1240), a second method of generating an MPM list may be used (S1241).

For example, according to the second method of generating an MPM list, at least one of a first prediction mode and a second prediction mode may be included in an MPM list. In addition, at least one of an adjacent mode of minAB and an adjacent mode of maxAB mode may be included in an MPM list. Herein, when a minAB mode and a maxAB mode are adjacent modes, at least one mode in an MPM list may be duplicated. In other words, an MPM list may include a same prediction mode in duplicate. Herein, the same prediction mode may be a directional mode.

For example, according to the second method of generating an MPM list, an MPM list may include at least one among a first prediction mode, a second prediction mode, a (minAB−1) mode, a (minAB+1) mode, a (maxAB−1) mode and a (maxAB+1) mode.

For example, when minAB is mode 4 and maxAB is mode 5, an MPM list can include at least one among a minAB mode, a maxAB mode, a (minAB−1) mode, a (minAB+1) mode, a (maxAB−1) mode, and a (maxAB+1) mode. Herein, since minAB+1 is mode 5 and maxAB−1 is mode 4, an MPM list may include mode 4 and mode 5 in duplicate.

For example, when at least one among (maxAB−minAB==1), (maxAB−minAB==2), and (maxAB−minAB>61) is satisfied, an MPM list may include at least one mode in duplicate.

For example, when a first prediction mode is not identical with a second prediction mode (No at S1210) and one of the two prediction modes is a non-directional mode and the other is a directional mode (Yes at S1230, No at S1240), a third method of generating an MPM list can be used (S1242).

For example, according to the third method of generating an MPM list, a directional mode may be included in an MPM list. In addition, at least one among adjacent modes of an included directional mode can be included in an MPM list.

For example, when a first prediction mode is a non-directional mode and a second prediction mode is a directional mode, an MPM list may include at least one among a second prediction mode, a (maxAB−1) mode, a (maxAB+1) mode, a (maxAB−2) mode, a (maxAB+2) mode, and a (maxAB−3) mode. Herein, when an adjacent mode of a second prediction mode is a non-directional mode, at least one among directional modes located in an opposite direction may be included in an MPM list.

For example, when a first prediction mode is not identical with a second prediction mode (No at S1210) and both modes are non-directional modes (No at S1230), a fourth method of generating an MPM list may be used (S1231).

For example, according to the fourth method of generating an MPM list, at least one among a vertical mode, a horizontal mode, a horizontal-diagonal mode, a diagonal mode, a vertical-diagonal mode and mode 26 may be included in an MPM list.

For example, when a first prediction mode is a planar mode and a second prediction mode is a DC mode, an MPM list may include at least one among a vertical mode, a horizontal mode, a horizontal-diagonal mode, a diagonal mode, a vertical-diagonal mode, and mode 26.

In an embodiment explained with reference to FIG. 12, if a predetermined condition is satisfied, an MPM list may include a directional mode in duplicate.

Figure 13:
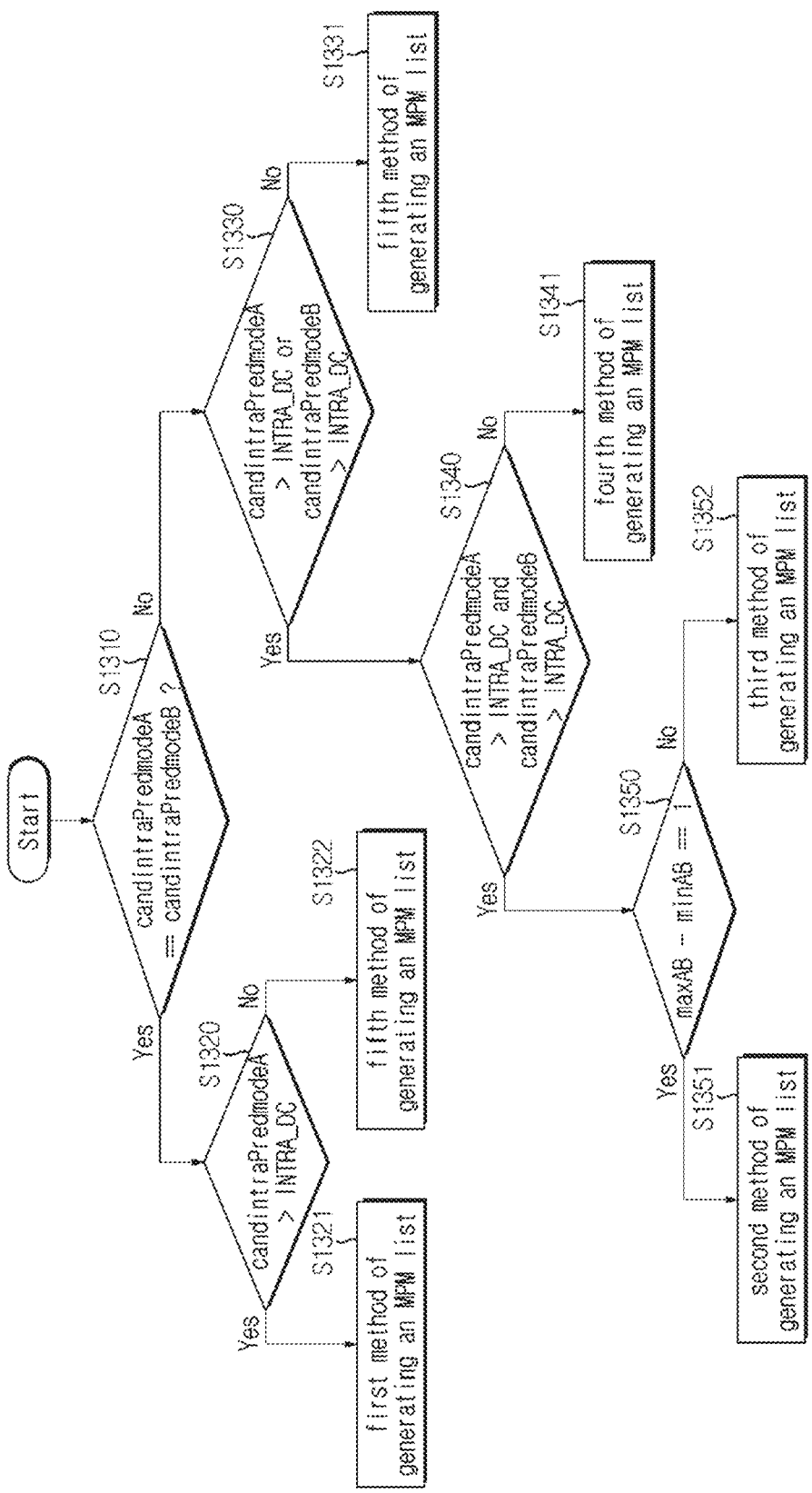
FIG. 13 is a view for explaining another example of configuring an MPM list.

FIG. 13 is a view for explaining another example of configuring an MPM list.

The method of configuring an MPM list in FIG. 13 may be used when, for example, a current block is a luma block and a 0-th or higher reference line is used.

Herein, an MPM list may include only a directional mode and/or a DC mode.

For example, when a first prediction mode is identical with a second prediction mode (Yes at S1310) and the corresponding prediction mode (the first prediction mode) is a directional mode (Yes at S1320), a first method of generating an MPM list may be used (S1321).

For example, according to the first method of generating an MPM list, the corresponding prediction mode (a first prediction mode) may be included in an MPM list. In addition, at least one among adjacent modes of the corresponding prediction mode may be included in an MPM list.

For example, according to the first method of generating an MPM list, an MPM list may include at least one among a first prediction mode, a (first prediction mode−1) mode, a (first prediction mode+1) mode, a (first prediction mode−2) mode, a (first prediction mode+2) mode, and a (first prediction mode−3) mode. Herein, when an adjacent mode of a first prediction mode is a non-directional mode, at least one among directional modes located in an opposite direction may be included in an MPM list.

For example, when a first prediction mode is identical with a second prediction mode (Yes at S1310) and the corresponding prediction mode (a first prediction mode) is a non-directional mode (No at S1320), a fifth method of generating an MPM list may be used (S1322).

For example, according to the fifth method of generating an MPM list, at least one among a vertical mode, a horizontal mode, a horizontal-diagonal mode, a diagonal mode, a vertical-diagonal mode and mode 26 may be included in an MPM list.

For example, when a first prediction mode is different from a second prediction mode (No at S1310) and both modes are directional modes (Yes at S1330, Yes at S1340), a difference value between the two modes (maxAB−minAB) may be obtained. When the difference between the two modes is 1 (Yes at S1350), a second method of generating an MPM list may be used (S1351).

For example, according to the second method of generating an MPM list, an MPM list may include at least one among a first prediction mode, a second prediction mode, an adjacent mode of a maxAB mode, and an adjacent mode of a minAB mode.

For example, according to the second method of generating an MPM list, an MPM list may include at least one among a first prediction mode, a second prediction mode, a (minAB−1) mode, a (maxAB+1) mode, a (minAB−2) mode and a (maxAB+2) mode.

For example, when the difference between two prediction modes (maxAB−minAB) is a predetermined integer, for example, 2 or more (No at S1350), a third method of generating an MPM list may be used (S1352).

For example, according to the third method of generating an MPM list, at least one of an adjacent mode of a maxAB mode and an adjacent mode of a minAB mode may be included in an MPM list.

For example, according to the third method of generating an MPM list, an MPM list may include at least one among a first prediction mode, a second prediction mode, a (minAB−1) mode, a (minAB+1) mode, a (maxAB−1) mode and a (minAB+1) mode.

For example, when at least one of (maxAB−minAB==2) and (maxAB−minAB>61) is satisfied, an MPM list may include at least one mode in duplicate. Herein, a duplicated mode may be a directional mode.

For example, when a first prediction mode is not identical with a second prediction mode (No at S1310) and one of the two prediction modes is a non-directional mode and the other is a directional mode (Yes at S1330, No at S1340), a fourth method of generating an MPM list may be used (S1341).

For example, according to the fourth method of generating an MPM list, an MPM list may include at least one of a directional mode and a mode adjacent thereto.

For example, according to the fourth method of generating an MPM list, when a first prediction mode is a non-directional mode and a second prediction mode is a directional mode, an MPM list may include a second prediction mode. In addition, an MPM list can include at least one among a (maxAB−1) mode, a (maxAB+1) mode, a (maxAB−2) mode, a (maxAB+2) mode, and a (maxAB−3) mode. Herein, when an adjacent mode of a second prediction mode is a non-directional mode, at least one among directional modes located in an opposite direction may be included in an MPM list.

For example, when a first prediction mode is different from a second prediction mode (No at S1310) and both modes are non-directional modes (No at S1330), a fifth method of generating an MPM list may be used.

For example, according to the fifth method of generating an MPM list, at least one among a vertical mode, a horizontal mode, a horizontal-diagonal mode, a diagonal mode, a vertical-diagonal mode and mode 26 may be included in an MPM list.

For example, according to the fifth method of generating an MPM list, when a first prediction mode is a planar mode and a second prediction mode is a DC mode, an MPM list may include at least one among a vertical mode, a horizontal mode, a horizontal-diagonal mode, a diagonal mode, a vertical-diagonal mode, and mode 26.

Figure 14:
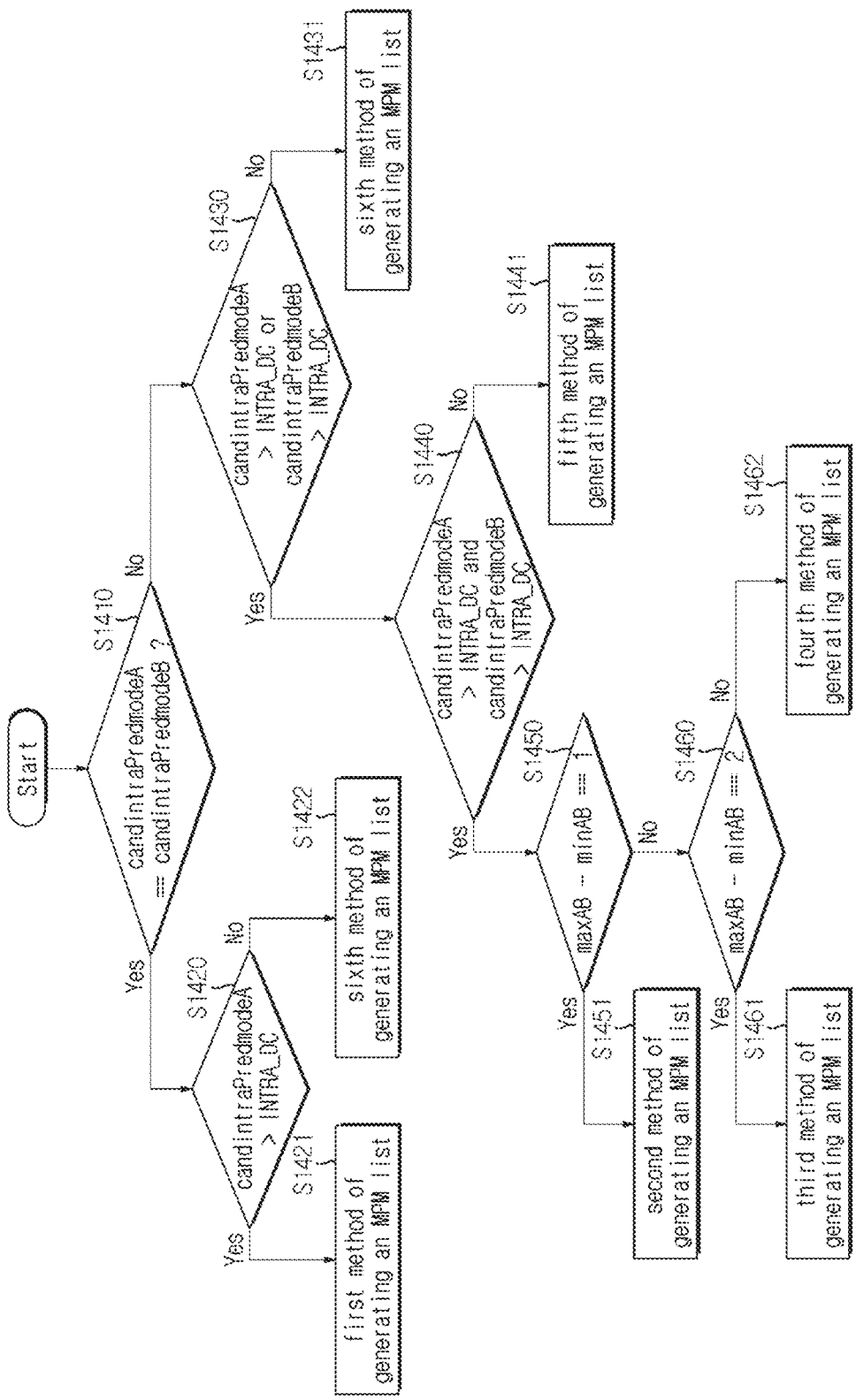
FIG. 14 is a view for explaining another example of configuring an MPM list.

FIG. 14 is a view for explaining another example of configuring an MPM list.

The method of configuring an MPM list in FIG. 14 may be used when, for example, a current block is a luma block and a 0-th or higher reference line is used.

Herein, an MPM list may include only a directional mode and/or a DC mode.

For example, when a first prediction mode is identical with a second prediction mode (Yes at S1410) and the corresponding prediction mode (the first prediction mode) is a directional mode (Yes at S1420), a first method of generating an MPM list may be used (S1421).

According to the first method of generating an MPM list, the corresponding prediction mode (a first prediction mode) may be included in an MPM list. In addition, at least one among adjacent modes of the corresponding prediction mode (a first prediction mode) may be included in an MPM list.

For example, according to the first method of generating an MPM list, an MPM list may include at least one among a first prediction mode, a (first prediction mode−1) mode, a (first prediction mode+1) mode, a (first prediction mode−2) mode, a (first prediction mode+2) mode, and a (first prediction mode−3) mode. Herein, when an adjacent mode of a first prediction mode is a non-directional mode, at least one among directional modes located in an opposite direction may be included in an MPM list.

For example, when a first prediction mode is identical with a second prediction mode (Yes at S1410) and the corresponding prediction mode (the first prediction mode) is a non-directional mode (No at S1420), a sixth method of generating an MPM list may be used (S1422).

According to the sixth method of generating an MPM list, at least one among a vertical mode, a horizontal mode, a horizontal-diagonal mode, a diagonal mode, a vertical-diagonal mode and mode 26 may be included in an MPM list.

For example, when a first prediction mode is different from a second prediction mode (No at S1410) and both modes are directional modes (Yes at S1430, Yes at S1440), a difference value between the two modes (maxAB−minAB) may be obtained. When the difference between the two modes is 1 (Yes at S1450), a second method of generating an MPM list may be used (S1451).

According to the second method of generating an MPM list, at least one of a first prediction mode and a second prediction mode may be included in an MPM list. In addition, at least one of an adjacent mode of a maxAB mode and an adjacent mode of a minAB mode may be included in an MPM list.

For example, according to the second method of generating an MPM list, an MPM list may include at least one among a first prediction mode, a second prediction mode, a (minAB−1) mode, a (maxAB+1) mode, a (minAB−2) mode and a (maxAB+2) mode.

For example, when the difference between two prediction modes (maxAB−minAB) is 2 (Yes at S1460), a third method of generating an MPM list may be used (S1461).

According to the third method of generating an MPM list, at least one of an adjacent mode of a minAB mode and an adjacent mode of a maxAB mode may be included in an MPM list.

For example, according to the third method of generating an MPM list, an MPM list may include at least one among a first prediction mode, a second prediction mode, a (minAB+1) mode, a (minAB−1) mode, a (maxAB+1) mode and a (minAB−2) mode.

When the difference between two prediction modes (maxAB−minAB) is 3 or more (No at S1460), a fourth method of generating an MPM list may be used (S1462).

According to the fourth method of generating an MPM list, at least one of an adjacent mode of a maxAB mode and an adjacent mode of a minAB mode may be included in an MPM list.

For example, according to the fourth method of generating an MPM list, an MPM list may include at least one among a first prediction mode, a second prediction mode, a (minAB−1) mode, a (minAB+1) mode, a (maxAB−1) mode and a (maxAB+1) mode.

For example, in the case of (maxAB−minAB>61), an MPM list may include at least one mode in duplicate. Herein, a duplicated mode may be a directional mode.

For example, when a first prediction mode is different from a second prediction mode (No at S1410) and one of the two prediction modes is a non-directional mode and the other is a directional mode (Yes at S1430, No at S1440), a fifth method of generating an MPM list may be used (S1441).

According to the fifth method of generating an MPM list, a directional mode may be included in an MPM list. In addition, at least one among adjacent modes of an included directional mode may be included in an MPM list.

For example, according to the fifth method of generating an MPM list, when a first prediction mode is a non-directional mode and a second prediction mode is a directional mode, an MPM list may include at least one among a second prediction mode, a (maxAB−1) mode, a (maxAB+1) mode, a (maxAB−2) mode, a (maxAB+2) mode, and a (maxAB−3) mode. Herein, when an adjacent mode of a second prediction mode is a non-directional mode, at least one among directional modes located in an opposite direction may be included in an MPM list.

For example, when a first prediction mode is different from a second prediction mode (No at S1410) and both modes are non-directional modes (No at S1430), a sixth method of generating an MPM list may be used (S1431).

According to the sixth method of generating an MPM list, at least one among a vertical mode, a horizontal mode, a horizontal-diagonal mode, a diagonal mode, a vertical-diagonal mode and mode 26 may be included in an MPM list.

For example, according to the sixth method of generating an MPM list, when a first prediction mode is a planar mode and a second prediction mode is a DC mode, an MPM list may include at least one among a vertical mode, a horizontal mode, a horizontal-diagonal mode, a diagonal mode, a vertical-diagonal mode, and mode 26.

Figure 15:
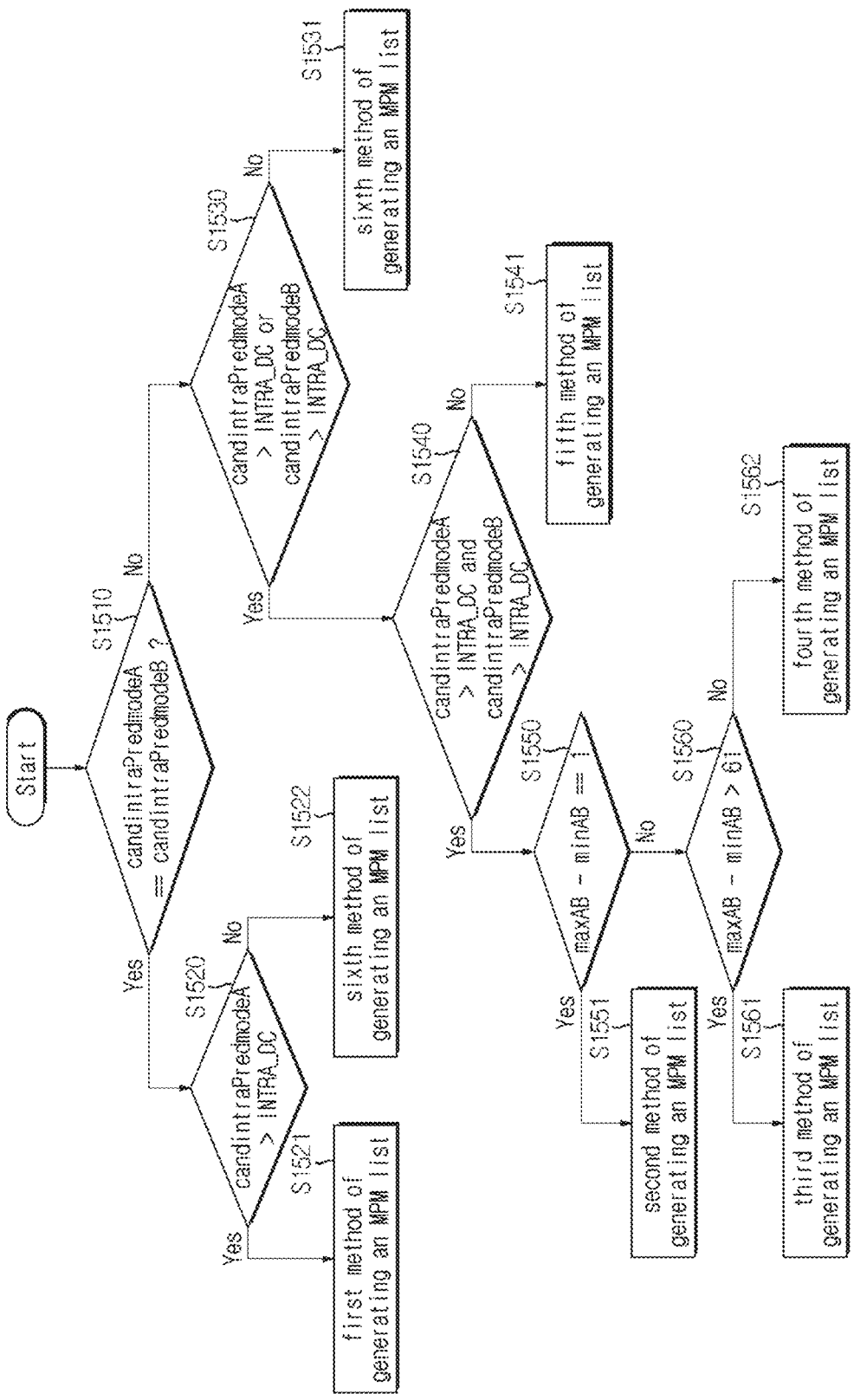
FIG. 15 is a view for explaining another example of configuring an MPM list.

FIG. 15 is a view for explaining another example of configuring an MPM list.

The method of configuring an MPM list in FIG. 15 may be used when, for example, a current block is a luma block and a 0-th or higher reference line is used.

Herein, an MPM list may include only a directional mode and/or a DC mode.

For example, when a first prediction mode is identical with a second prediction mode (Yes at S1510) and the corresponding prediction mode (the first prediction mode) is a directional mode (Yes at S1520), a first method of generating an MPM list may be used (S1521).

According to the first method of generating an MPM list, the corresponding prediction mode (a first prediction mode) may be included in an MPM list. In addition, at least one among adjacent modes of the corresponding prediction mode (a first prediction mode) may be included in an MPM list.

For example, according to the first method of generating an MPM list, an MPM list may include at least one among a first prediction mode, a (first prediction mode−1) mode, a (first prediction mode+1) mode, a (first prediction mode−2) mode, a (first prediction mode+2) mode, and a (first prediction mode−3) mode. Herein, when an adjacent mode of a first prediction mode is a non-directional mode, at least one among directional modes located in an opposite direction may be included in an MPM list.

For example, when a first prediction mode is identical with a second prediction mode (Yes at S1510) and the corresponding prediction mode (the first prediction mode) is a non-directional mode (No at S1520), a sixth method of generating an MPM list may be used (S1522).

According to the sixth method of generating an MPM list, at least one among a vertical mode, a horizontal mode, a horizontal-diagonal mode, a diagonal mode, a vertical-diagonal mode and mode 26 may be included in an MPM list.

For example, when a first prediction mode is different from a second prediction mode (No at S1510) and both modes are directional modes (Yes at S1530, Yes at S1540), a difference value between the two modes (maxAB−minAB)

may be obtained. When a difference value is 1 (Yes at S1550), a second method of generating an MPM list may be used (S1551).

According to the second method of generating an MPM list, at least one of a first prediction mode and a second prediction mode may be included in an MPM list. In addition, at least one of an adjacent mode of maxAB mode and an adjacent mode of minAB mode may be included in an MPM list.

For example, according to a second method of generating an MPM list, an MPM list may include at least one among a first prediction mode, a second prediction mode, a (minAB−1) mode, a (maxAB+1) mode, a (minAB−2) mode and a (maxAB+2) mode.

For example, when the difference between two prediction modes (maxAB−minAB) is 62 or more (Yes at S1560), a third method of generating an MPM list may be used (S1561).

According to the third method of generating an MPM list, at least one of a first prediction mode and a second prediction mode may be included in an MPM list. In addition, at least one of an adjacent mode of maxAB mode and an adjacent mode of minAB mode may be included in an MPM list.

For example, according to the third method of generating an MPM list, an MPM list may include at least one among a first prediction mode, a second prediction mode, a (minAB+1) mode, a (maxAB−1) mode, a (minAB+2) mode and a (maxAB−2) mode.

For example, when the difference between two prediction modes (maxAB−minAB) is equal to or greater than 2 and equal to or less than 61 (No at S1560), a fourth method of generating an MPM list may be used (S1562).

According to the fourth method of generating an MPM list, at least one of a first prediction mode and a second prediction mode may be included in an MPM list. In addition, at least one of an adjacent mode of maxAB mode and an adjacent mode of minAB mode may be included in an MPM list.

For example, according to the fourth method of generating an MPM list, an MPM list may include at least one among a first prediction mode, a second prediction mode, a (minAB−1) mode, a (minAB+1) mode, a (maxAB−1) mode and a (maxAB+1) mode.

For example, in the case of (maxAB−minAB==2), an MPM list may include at least one mode in duplicate. Herein, a duplicated mode may be a directional mode.

For example, when a first prediction mode is different from a second prediction mode (No at S1510) and one of the two prediction modes is a non-directional mode and the other is a directional mode (Yes at S1530, No at S1540), a fifth method of generating an MPM list may be used (S1541).

According to the fifth method of generating an MPM list, a directional mode may be included in an MPM list. In addition, at least one among adjacent modes of an included directional mode may be included in an MPM list.

For example, according to the fifth method of generating an MPM list, when a first prediction mode is a non-directional mode and a second prediction mode is a directional mode, an MPM list may include at least one among a second prediction mode, a (maxAB−1) mode, a (maxAB+1) mode, a (maxAB−2) mode, a (maxAB+2) mode, and a (maxAB−3) mode. Herein, when an adjacent mode of a second prediction mode is a non-directional mode, at least one among directional modes located in an opposite direction may be included in an MPM list.

For example, when a first prediction mode is different from a second prediction mode (No at S1510) and both modes are non-directional modes (No at S1530), a sixth method of generating an MPM list may be used (S1531).

According to the sixth method of generating an MPM list, at least one among a vertical mode, a horizontal mode, a horizontal-diagonal mode, a diagonal mode, a vertical-diagonal mode and mode 26 may be included in an MPM list.

For example, according to the sixth method of generating an MPM list, when a first prediction mode is a planar mode and a second prediction mode is a DC mode, an MPM list may include at least one among a vertical mode, a horizontal mode, a horizontal-diagonal mode, a diagonal mode, a vertical-diagonal mode, and mode 26.

Figure 16:
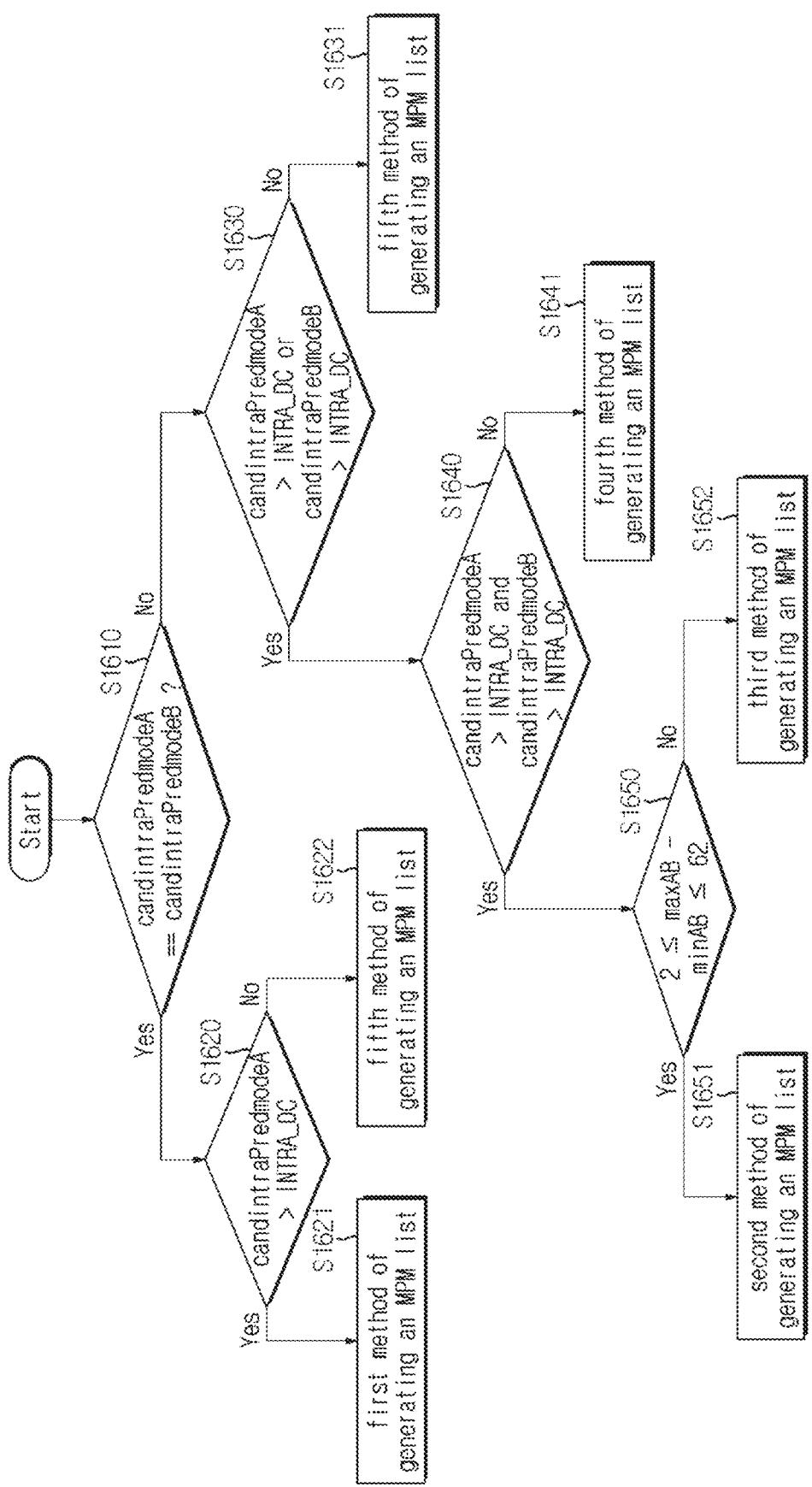
FIG. 16 is a view for explaining another example of configuring an MPM list.

FIG. 16 is a view for explaining another example of configuring an MPM list.

The method of configuring an MPM list in FIG. 16 may be used when, for example, a current block is a luma block and a 0-th or higher reference line is used.

Herein, an MPM list may include at least one of a non-directional mode or a directional mode.

For example, when a first prediction mode is identical with a second prediction mode (Yes at S1610) and the corresponding prediction mode (the first prediction mode) is a directional mode (Yes at S1620), a first method of generating an MPM list may be used (S1621).

According to the first method of generating an MPM list, at least one among the corresponding prediction mode (a first prediction mode), a planar mode and a DC mode that are non-directional modes may be included in an MPM list. In addition, at least one among adjacent modes of the corresponding prediction mode (a first prediction mode) may be included in an MPM list.

For example, according to the first method of generating an MPM list, an MPM list may include at least one among a first prediction mode, a planar mode, a DC mode, a (first prediction mode−1) mode, a (first prediction mode+1) mode, and a (first prediction mode−2) mode. Herein, when an adjacent mode of a first prediction mode is a non-directional mode, at least one among directional modes located in an opposite direction may be included in an MPM list.

For example, when a first prediction mode is identical with a second prediction mode (Yes at S1610) and the corresponding prediction mode (a first prediction mode) is a non-directional mode (No at S1620), a fifth method of generating an MPM list may be used (S1622).

According to the fifth method of generating an MPM list, the corresponding prediction mode (a first prediction mode) may be included in an MPM list. In addition, when the corresponding prediction mode (a first prediction mode) is a planar mode, a DC mode may be included in an MPM list. In addition, when the corresponding prediction mode (a first prediction mode) is a DC mode, a planar mode may be included in an MPM list. In addition, at least one among a vertical mode, a horizontal mode, a (vertical−4) mode and a (vertical+4) mode may be included in an MPM list.

For example, when a first prediction mode is different from a second prediction mode (No at S1610) and both modes are directional modes (Yes at S1630, Yes at S1640), at least one of a first prediction mode and a second prediction mode may be included in an MPM list. In addition, at least one of a planar mode and a DC mode that are non-directional mode may be included in an MPM list. In addition, a difference value between two prediction modes (maxAB−minAB) may be obtained. When the difference value is equal to or greater than 2 and equal to or less than 62 (Yes at S1650), a second method of generating an MPM list may be used (S1651).

According to the second method of generating an MPM list, at least one among adjacent modes of a maxAB mode may be included in an MPM list.

For example, according to the second method of generating an MPM list, an MPM list may include at least one among a first prediction mode, a second prediction mode, a planar mode, a DC mode, a (maxAB−1) mode, and a (maxAB+1) mode.

When the difference between two prediction modes (maxAB−minAB) is equal to or less than 1 or equal to or greater than 63 (No at S1650), a third method of generating an MPM list may be used (S1652).

According to the third method of generating an MPM list, at least one of an adjacent mode of a maxAB mode and an adjacent mode of a minAB mode may be included in an MPM list.

For example, according to the third method of generating an MPM list, an MPM list may include at least one among a first prediction mode, a second prediction mode, a planar mode, a DC mode, a (maxAB−2) mode, and a (maxAB+2) mode.

For example, when a first prediction mode is different from a second prediction mode (No at S1610) and one of the two prediction modes is a non-directional mode and the other is a directional mode (No at S1640), a fourth method of generating an MPM list may be used (S1641).

According to the fourth method of generating an MPM list, at least one of a first prediction mode and a second prediction mode may be included in an MPM list. In addition, when a non-directional mode included in an MPM list is a planar mode, a DC mode may be included in an MPM list. In addition, when a non-directional mode included in an MPM list is a DC mode, a planar mode may be included in an MPM list. In addition, at least one among adjacent modes of a maxAB mode may be included in an MPM list.

For example, according to the fourth method of generating an MPM list, when a first prediction mode is a non-directional mode and a second prediction mode is a directional mode, an MPM list may include at least one among a planar mode, a second prediction mode, a DC mode, a (second prediction mode−1) mode, a (second prediction mode+1) mode, and a (second prediction mode−2) mode. Herein, when an adjacent mode of a second prediction mode is a non-directional mode, at least one among directional modes located in an opposite direction may be included in an MPM list.

For example, when a first prediction mode is different from a second prediction mode (No at S1610) and both modes are non-directional modes (No at S1630), a fifth method of generating an MPM list may be used (S1631).

According to the fifth method of generating an MPM list, at least one of a first prediction mode and a second prediction mode may be included in an MPM list. In addition, at least one among a vertical mode, a horizontal mode, a (vertical−4) mode and a (vertical+4) mode may be included in an MPM list.

For example, according to the fifth method of generating an MPM list, when a first prediction mode is a planar mode and a second prediction mode is a DC mode, an MPM list may include at least one among a planar mode, a DC mode, a vertical mode, a horizontal mode, a (vertical−4) mode, and a (vertical+4) mode.

In an embodiment described in this specification, a flag indicating whether or not a planar mode is used may be signaled. The corresponding flag may be expressed as intra_luma_not_planar_flag. When intra_luma_not_planar_flag is a first value, it may mean that a planar mode is used. When intra_luma_not_planar_flag is a second value, it may mean that a planar mode is not used. Herein, a first value may be 0, and a second value may be 1.

In an embodiment described in this specification, when intra_luma_not_planar_flag is signaled, a planar mode may be treated differently from an MPM candidate mode included in an MPM list. For example, an MPM list may be configured except a planar mode. When an MPM mode is applied for a current block, intra_luma_not_planar_flag may be preferentially reconstructed so that whether or not the mode of a current block is a planar mode may be decided. When the mode of a current block is not a planar mode, an MPM list excluding a planar mode may be configured by one of the embodiments described in this specification.

Intra_luma_not_planar_flag may be signaled only when the reference line 0 is referred to. For example, when a reference line 1 or more is referred to, intra_luma_not_planar_flag may not be signaled through a bitstream. In this case, intra_luma_not_planar_flag may be inferred as a second value. In other words, when a reference line 1 or more is referred to, an intra-prediction mode of a current block may not be a planar mode.

A method of generating an MPM list according to an embodiment described in this specification may be applied in the same way when a current block is an ISP mode. For example, as shown in FIG. 8, when a current block is partitioned into a plurality of sub-blocks and intra prediction is sequentially performed for each sub-block, an MPM list for a current block may be generated by one of the embodiments explained with reference to drawings of this invention.

Figure 17:
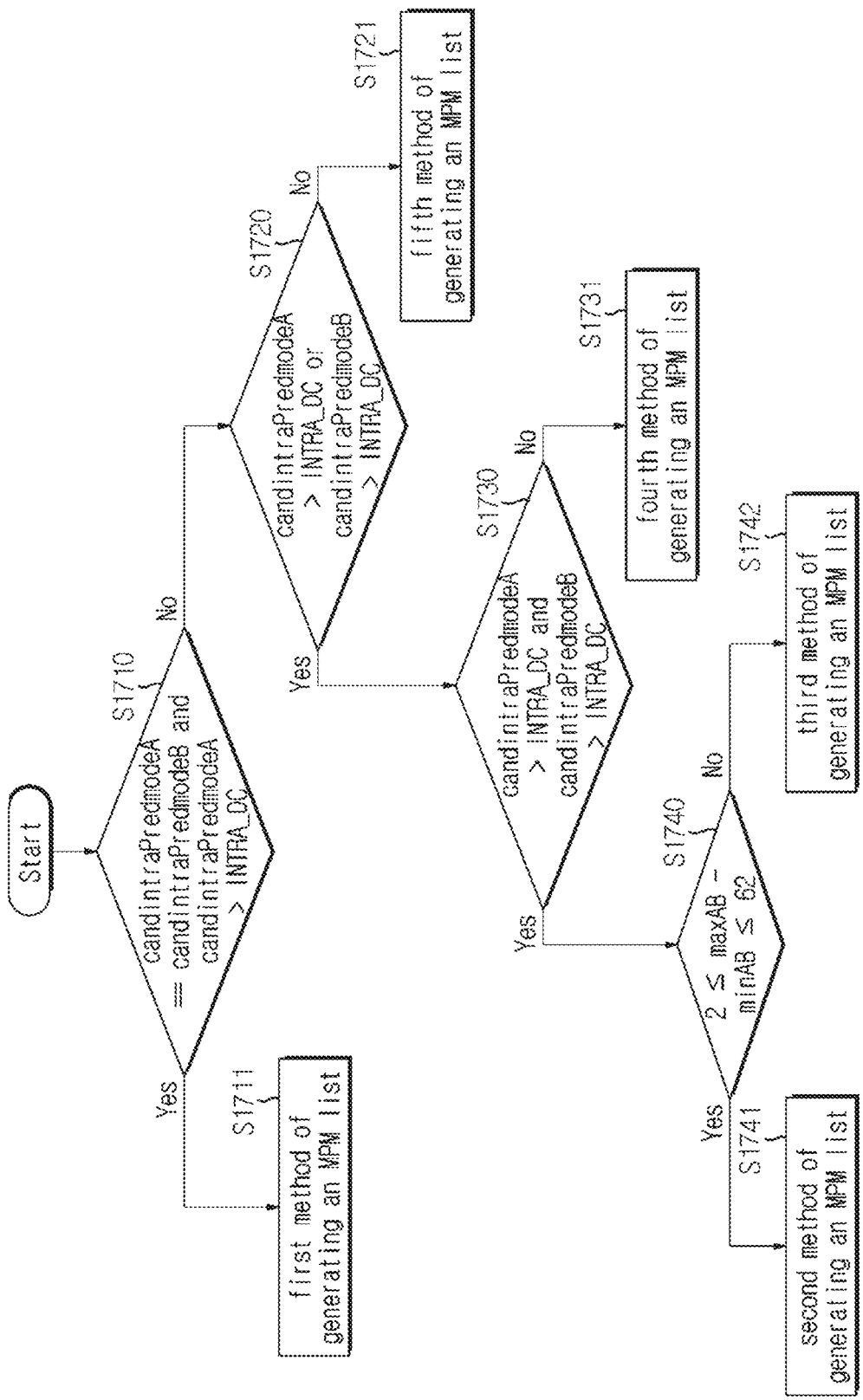
FIG. 17 is a view for explaining another example of configuring an MPM list.

FIG. 17 is a view for explaining another example of configuring an MPM list.

The method of configuring an MPM list in FIG. 17 may be used when, for example, a current block is a luma block and a 0-th or higher reference line is used.

Herein, an MPM list may include at least one of a non-directional mode and a directional mode. Herein, an MPM list may not include a planar mode.

In addition, an MPM list may consist of unique intra-prediction modes that are not duplicated with each other.

For example, when a first prediction mode is identical with a second prediction mode and the corresponding prediction mode (a first prediction mode) is a directional mode (Yes at S1710), a first method of generating an MPM list may be used (S1711).

According to the first method of generating an MPM list, at least one of the corresponding prediction mode (a first prediction mode) and a DC mode that is a non-directional mode may be included in an MPM list. In addition, at least one among adjacent modes of the corresponding prediction mode (a first prediction mode) may be included in an MPM list.

For example, according to the first method of generating an MPM list, an MPM list may include at least one among a first prediction mode, a DC mode, a (first prediction mode−1) mode, a (first prediction mode+1) mode, and a (first prediction mode−2) mode. Herein, when an adjacent mode of a first prediction mode is a non-directional mode, at least one among directional modes located in an opposite direction may be included in an MPM list. Alternatively, for example, according to the first method of generating an MPM list, an MPM list may be configured to include only a first prediction mode and a mode adjacent thereto. For example, an MPM list may include at least one among a first prediction mode, a (first prediction mode−1) mode, a (first prediction mode+1) mode, a (first prediction mode−2) mode, and a (first prediction mode+2) mode.

For example, when a first prediction mode is different from a second prediction mode and both modes are directional modes (No at S1710, Yes at S1720, Yes at S1730), at least one of a first prediction mode and a second prediction mode may be included in an MPM list. Alternatively, a DC mode that is a non-directional mode may be included in an MPM list.

In addition, a difference value between two prediction modes (maxAB−minAB) may be obtained. When the difference value is equal to or greater than 2 and equal to or less than 62 (Yes at S1740), a second method of generating an MPM list may be used.

When a second method of generating an MPM list is used, an MPM list may include at least one among adjacent modes of a maxAB mode.

For example, according to the second method of generating an MPM list, an MPM list may sequentially include at least one among a first prediction mode, a second prediction mode, a DC mode, a (maxAB−1) mode and a (maxAB+1) mode. Herein, an order of including an MPM candidate mode in an MPM list is not limited to the above example. For example, a second prediction mode may be included in front of a first prediction mode. Alternatively, a (maxAB+1) mode may be included in front of a (maxAB−1) mode. Alternatively, for example, according to the second method of generating an MPM list, an MPM list may include at least one of a first prediction mode and a second prediction mode and may further include three modes among a (minAB+1) mode, a (minAB−1) mode, a (maxAB+1) mode and a (maxAB−1) mode.

For example, when the difference between two prediction modes (maxAB−minAB) is equal to or less than 1 or equal to or greater than 63 (No at S1740), a third method of generating an MPM list may be used (S1742).

According to the third method of generating an MPM list, at least one among adjacent modes of a maxAB mode may be included in an MPM list.

For example, according to the third method of generating an MPM list, an MPM list may sequentially include at least one among a first prediction mode, a second prediction mode, a DC mode, a (maxAB−2) mode and a (maxAB+2) mode. Herein, an order of including an MPM candidate mode in an MPM list is not limited to the above example. For example, a second prediction mode may be included in front of a first prediction mode. Alternatively, a (maxAB+2) mode may be located in front of a (maxAB−2) mode. Alternatively, for example, according to the third method of generating an MPM list, an MPM list may include at least one of a first prediction mode and a second prediction mode and may further include a (minAB−1) mode, a (maxAB+1) mode and a (minAB−2) mode. Alternatively, an MPM list may be so configured to include at least one among a first prediction mode, a second prediction mode, a (minAB+1) mode, a (maxAB−1) mode, and a (minAB+2) mode.

For example, when a first prediction mode is different from a second prediction mode and one of the two prediction modes is a non-directional mode and the other is a directional mode (No at S1710, Yes at S1720, No at S1730), a fourth method of generating an MPM list may be used (S1731).

According to the fourth method of generating an MPM list, a directional mode of two prediction modes may be included in an MPM list. In addition, a DC mode that is a non-directional mode may be included in an MPM list. In addition, at least one among adjacent modes of a directional mode may be included in an MPM list.

For example, according to the fourth method of generating an MPM list, when a first prediction mode is a non-directional mode and a second prediction mode is a directional mode, an MPM list may sequentially include at least one among a second prediction mode, a DC mode, a (second prediction mode−1) mode, a (second prediction mode+1) mode, and a (second prediction mode−2) mode. Herein, when a mode adjacent to a second prediction mode is a non-directional mode, at least one among directional modes located in an opposition direction may be included in an MPM list. Herein, an order of including an MPM candidate mode in an MPM list is not limited to the above example. For example, a (second prediction mode+1) mode may be included in front of a (second prediction mode−1) mode. Alternatively, for example, according to the fourth method of generating an MPM list, an MPM list may be so configured to include only a directional mode. In this case, an MPM list may also be configured to include a second prediction mode, a (second prediction mode−1) mode, a (second prediction mode+1) mode, a (second prediction mode−2) mode, and a (second prediction mode+2) mode.

For example, when a first prediction mode is not identical with a second prediction mode and both modes are non-directional modes (No at S1710, No at S1720), a fifth method of generating an MPM list may be used (S1721).

According to the fifth method of generating an MPM list, a DC mode of two prediction modes may be included in an MPM list. In addition, at least one among a vertical mode, a horizontal mode, a (vertical−4) mode and a (vertical+4) mode may be included in an MPM list.

For example, according to the fifth method of generating an MPM list, when a first prediction mode is a planar mode and a second prediction mode is a DC mode, an MPM list may sequentially include at least one among a DC mode, a vertical mode, a horizontal mode, a (vertical−4) mode, and a (vertical+4) mode. Herein, an order of including an MPM candidate mode in an MPM list is not limited to the above example. For example, a (vertical+4) mode may be included in front of a (vertical−4) mode.

In an embodiment disclosed in this specification, a flag indicating whether or not an intra-prediction mode of a current block is a DC mode may be signaled. The corresponding flag may be expressed as intra_luma_not_dc_flag. When intra_luma_not_do_flag is a first value, it may mean that a DC mode is used. When intra_luma_not_dc_flag is a second value, it may mean that a DC mode is not used. Herein, a first value may be 0, and a second value may be 1.

In an embodiment described in this specification, when intra_luma_not_dc_flag is signaled, a DC mode may be treated differently from an MPM candidate mode included in an MPM list. For example, an MPM list may be configured except a DC mode. When an MPM mode is applied for a current block, intra_luma_not_dc_flag may be preferentially reconstructed so that whether or not the mode of a current block is a DC mode may be decided. When the mode of a current block is not a DC mode, an MPM list excluding a DC mode may be configured by one of the embodiments described in this specification.

Figure 18:
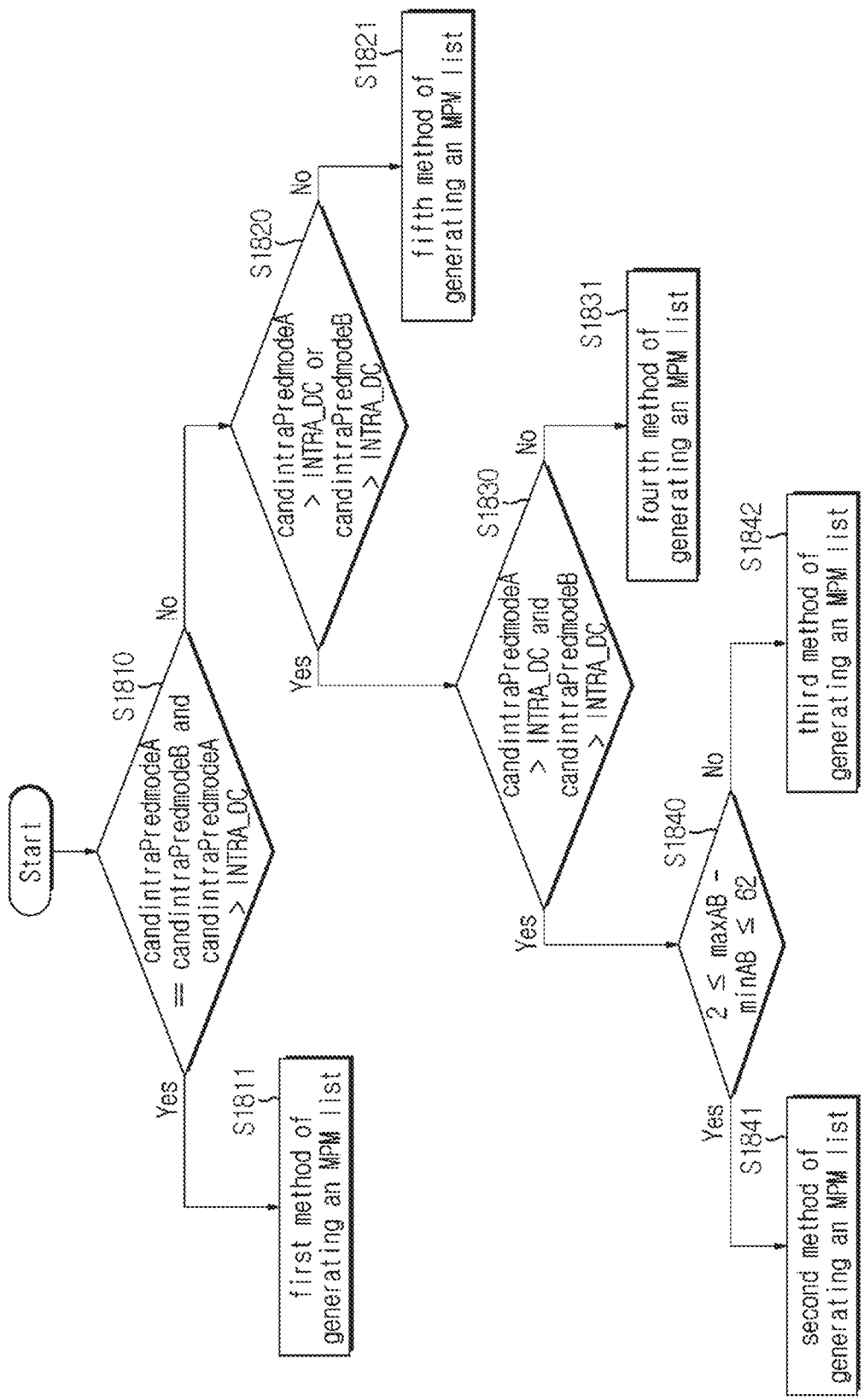
FIG. 18 is a view for explaining another example of configuring an MPM list.

FIG. 18 is a view for explaining another example of configuring an MPM list.

The method of configuring an MPM list in FIG. 18 may be used when, for example, a current block is a luma block and a 0-th or higher reference line is used.

Herein, an MPM list may include only a directional mode and/or a DC mode.

Herein, only a DC mode may be included as a non-directional mode, and neither mode may be excluded.

For example, when a first prediction mode is identical with a second prediction mode and the corresponding prediction mode (a first prediction mode) is a directional mode (Yes at S1810), a first method of generating an MPM list may be used (S1811).

According to the first method of generating an MPM list, the corresponding prediction mode (a first prediction mode) may be included in an MPM list. In addition, at least one among adjacent modes to the corresponding prediction mode (a first prediction mode) may be included in an MPM list.

For example, according to the first method of generating an MPM list, an MPM list may sequentially include at least one among a first prediction mode, a (first prediction mode−1) mode, a (first prediction mode+1) mode, and a (first prediction mode−2) mode. Herein, when an adjacent mode of a first prediction mode is a non-directional mode, at least one among directional modes located in an opposite direction may be included in an MPM list. Herein, an order of including an MPM candidate mode in an MPM list is not limited to the above example. For example, a (first prediction mode+1) mode may be located in front of a (first prediction mode−1) mode.

For example, when a first prediction mode is different from a second prediction mode (No at S1810) and both modes are directional modes (Yes at S1820, Yes at S1830), at least one of a first prediction mode and a second prediction mode may be included in an MPM list. In addition, a difference value between two prediction modes (maxAB−minAB) may be obtained. When the difference value is equal to or greater than 2 and equal to or less than 62 (Yes at S1840), a second method of generating an MPM list may be used.

According to the second method of generating an MPM list, at least one among adjacent modes of a maxAB mode may be included in an MPM list.

For example, according to the second method of generating an MPM list, an MPM list may sequentially include at least one among a first prediction mode, a second prediction mode, a (maxAB−1) mode, and a (maxAB+1) mode. Herein, an order of including an MPM candidate mode in an MPM list is not limited to the above example. For example, a second prediction mode may be included in front of a first prediction mode. Alternatively, a (maxAB+1) mode may be included in front of a (maxAB−1) mode.

For example, when the difference between two prediction modes (maxAB−minAB) is equal to or less than 1 or equal to or greater than 63 (No at S1840), a third method of generating an MPM list may be used (S1842).

According to the third method of generating an MPM list, at least one among adjacent modes of a maxAB mode may be included in an MPM list.

For example, according to the third method of generating an MPM list, an MPM list may sequentially include at least one among a first prediction mode, a second prediction mode, a (maxAB−2) mode, and a (maxAB+2) mode. Herein, an order of including an MPM candidate mode in an MPM list is not limited to the above example. For example, a second prediction mode may be included in front of a first prediction mode. Alternatively, a (maxAB+2) mode may be included in front of a (maxAB−2) mode.

For example, when a first prediction mode is different from a second prediction mode (No at S1810) and one of the two prediction modes is a non-directional mode and the other is a directional mode (Yes at S1820, No at S1830), a fourth method of generating an MPM list may be used (S1831).

According to the fourth method of generating an MPM list, a directional mode of two prediction modes may be included in an MPM list. In addition, at least one among adjacent modes of a maxAB mode may be included in an MPM list.

For example, according to the fourth method of generating an MPM list, when a first prediction mode is a non-directional mode and a second prediction mode is a directional mode, an MPM list may sequentially include at least one among a second prediction mode, a (second prediction mode−1) mode, a (second prediction mode+1) mode, and a (second prediction mode−2) mode. Herein, when an adjacent mode of a second prediction mode is a non-directional mode, at least one among directional modes located in an opposite direction may be included in an MPM list. Herein, an order of including an MPM candidate mode in an MPM list is not limited to the above example. For example, a (second prediction mode+1) mode may be included in front of a (second prediction mode−1) mode.

For example, when a first prediction mode is different from a second prediction mode (No at S1810) and both modes are non-directional modes (No at S1820), a fifth method of generating an MPM list can be used (S1821).

According to the fifth method of generating an MPM list, at least one among a vertical mode, a horizontal mode, a (vertical−4) mode, and a (vertical+4) mode may be included in an MPM list.

For example, according to the fifth method of generating an MPM list, when a first prediction mode is a planar mode and a second prediction mode is a DC mode, an MPM list may sequentially include at least one among a vertical mode, a horizontal mode, a (vertical−4) mode, and a (vertical+4) mode. Herein, an order of including an MPM candidate mode in an MPM list is not limited to the above example. For example, a (vertical+4) mode can be included in front of a (vertical−4) mode.

In an embodiment described in this specification, when a current block is a luma block and a 0-th or higher reference line is used, it may mean a condition that configuring an MPM list in a mode using a plurality of reference lines and configuring an MPM list in a general intra-prediction mode may be performed by a same method of configuring an MPM list. In an embodiment described in this specification, a method of configuring an MPM list in a mode using a plurality of reference lines may be the same as a method of configuring an MPM list in a general intra-prediction mode.

In an embodiment described in this specification, an MPM list may include an MPM candidate mode in the following order.

For example, a first prediction mode may be included in front of a mode adjacent thereto (a low value index). For example, a mode adjacent to a first prediction mode may be included in ascending order of difference value from a first prediction mode. For example, a first prediction mode may be included in front of a DC mode that is a non-directional mode. For example, a DC mode that is a non-directional mode may be included between a mode with a difference value of 1 from a first prediction mode and a mode with a difference value of 2 from a first prediction mode among adjacent modes of a first prediction mode. For example, an adjacent mode with a difference value of −1 from a first prediction mode may be included in front of an adjacent mode with a difference value of +1 from a first prediction mode. For example, an adjacent mode with a difference value of +1 from a first prediction mode may be included in front of an adjacent mode with a difference value of −1 from a first prediction mode.

For example, a DC mode that is a non-directional mode may be included in a foremost position. For example, a maxAB mode may be included in a foremost position. For example, an adjacent mode of a minAB mode may be included in front of an adjacent mode of a maxAB mode. For example, an adjacent mode of a maxAB mode may be included between an adjacent mode of a minAB mode and another adjacent mode of a minAB mode. For example, a maxAB mode may be included in front of an adjacent mode of a maxAB mode.

For example, a first prediction mode may be located in front of a second prediction mode. For example, a second prediction mode may be located in front of a first prediction mode. For example, a first prediction mode and a second prediction mode may be located in front of an adjacent mode of a maxAB mode. For example, a first prediction mode and a second prediction mode may be located in front of a DC mode that is a non-directional mode. For example, a DC mode that is a non-directional mode may be located in front of an adjacent mode of a maxAB mode. For example, among adjacent modes of a max AB mode, a prediction mode with a difference of −1 may be located in front of a prediction mode with a difference of +1. For example, among adjacent modes of a max AB mode, a prediction mode with a difference of +1 may be located in front of a prediction mode with a difference of −1. For example, among adjacent modes of a max AB mode, a prediction mode with a difference of −2 may be located in front of a prediction mode with a difference of +2. For example, among adjacent modes of a max AB mode, a prediction mode with a difference of +2 may be located in front of a prediction mode with a difference of −2.

For example, a first prediction mode and a second prediction mode may be located in front of an adjacent mode of a directional mode. For example, an adjacent mode of a directional mode may be located in ascending order of difference value from a directional mode. For example, among adjacent modes of a directional mode, a prediction mode with a difference of −1 may be located in front of a prediction mode with a difference of +1. For example, among adjacent modes of a directional mode, a prediction mode with a difference of +1 may be located in front of a prediction mode with a difference of −1.

For example, a DC mode that is a non-directional mode may be located in front of a directional mode. For example, a vertical mode may be located in front of a horizontal mode. For example, a vertical mode and a horizontal mode may be located in front of an adjacent mode of a vertical mode. For example, among adjacent modes of a vertical mode, a prediction mode with a difference of −4 may be located in front of a prediction mode with a difference of +4. For example, among adjacent modes of a vertical mode, a prediction mode with a difference of +4 may be located in front of a prediction mode with a difference of −4.

Being included in the front of an MPM list may mean that an index value for an MPM list is smaller. For example, in an MPM list, a first mode may be included in front of a second mode.

When a current block is a chroma block and a LM (Linear Mode) cannot be used, in other words, when cclm_enabled_flag is a first value, a DM (Direct Mode) may be used to derive a candidate mode of an intra-prediction mode of a current block.

A DM may be a candidate mode of a current chroma block, which is derived by using an intra-prediction mode of a luma block corresponding to the position of a current chroma block. A luma block and a chroma block may be partitioned into a same structure or into different structures.

Figure 19:
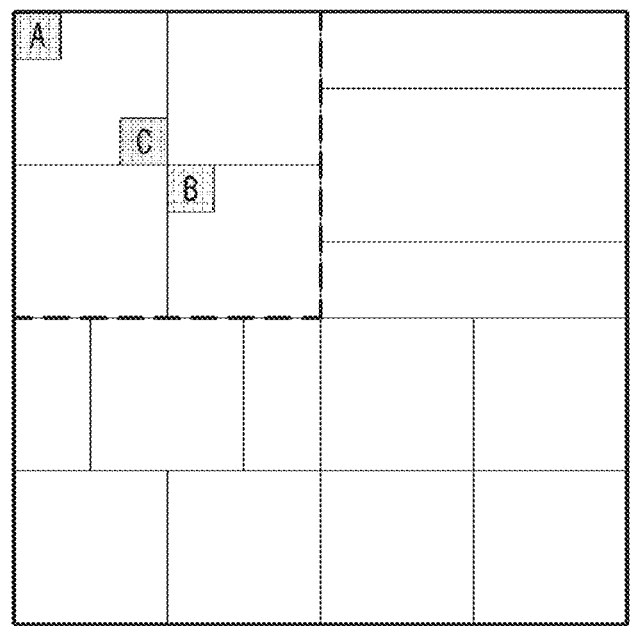
FIG. 19 is a view for explaining a position of a luma block that is used to configure a candidate mode of a current chroma block according to one embodiment of this invention.

FIG. 19 is a view for explaining a position of a luma block that is used to configure a candidate mode of a current chroma block according to one embodiment of this invention.

In FIG. 19, at this time, the dark dotted line means a current chroma block that is a prediction target, and the thick solid line means the corresponding luma block. In addition, the thin solid line represents a partition structure of a luma block.

In an example illustrated in FIG. 19, in order to configure a candidate mode of a current chroma block, at least one among the sample positions A, B and C of the corresponding chroma block may be used.

A prediction mode of a luma block may be expressed as IntraPredModeY. For example, a prediction mode of a luma block sample corresponding to position A may be expressed as IntraPredModeY[xCb][yCb], and a prediction mode of a luma block sample corresponding to position B may be expressed as IntraPredModeY[xCb+cbWidth/2][yCb+cbHeight/2]. A prediction mode of a luma block sample corresponding to position C may be expressed as IntraPredModeY [xCb+cbWidth/2−1][yCb+cbHeight/2−1]. Herein, xCb and yCb may mean the upper-left position of a chroma block corresponding to the upper-left position of a luma block within a current picture. In addition, cbWidth and cbHeight may mean a width and a height of a luma block corresponding to a current chroma block.

For example, if the size of a current chroma block is 16×8 in YUV4:2:0 format, cbWidth and cbHeight may be calculated to be 32×16 respectively.

Table 1 presents candidate modes of a chroma block according to prediction modes of a luma block corresponding to a current chroma block.

TABLE 1

| prediction candidate mode list of a chroma block | prediction candidate mode list of a luma block | | | | |
|---|---|---|---|---|---|
| | 0(Planar) | 50(vertical) | 18(horizontal) | 1(DC) | x(0 ≤ x ≤ 66) |
| 0 | 66 | 0 | 0 | 0 | 0 |
| 1 | 50 | 66 | 50 | 60 | 50 |
| 2 | 18 | 18 | 66 | 18 | 18 |
| 3 | 1 | 1 | 1 | 66 | 1 |
| 4 | 0 | 60 | 18 | 1 | x |

For example, when a prediction mode of the corresponding luma block is a planar mode, a candidate mode list of a current chroma block may include a vertical-diagonal mode (mode 66), a vertical mode (mode 50), a vertical mode (mode 18), a DC mode (mode 1), and a planar mode (mode 0).

For example, when a prediction mode of the corresponding luma block is a vertical mode, a candidate mode list of a current chroma block may include at least one among a planar mode, a vertical-diagonal mode, a horizontal mode, a DC mode, and a vertical mode.

An encoder/decoder may generate a prediction block by using a candidate mode list of a current chroma block and a reference line index of a luma block corresponding to a current chroma block.

Figure 20:
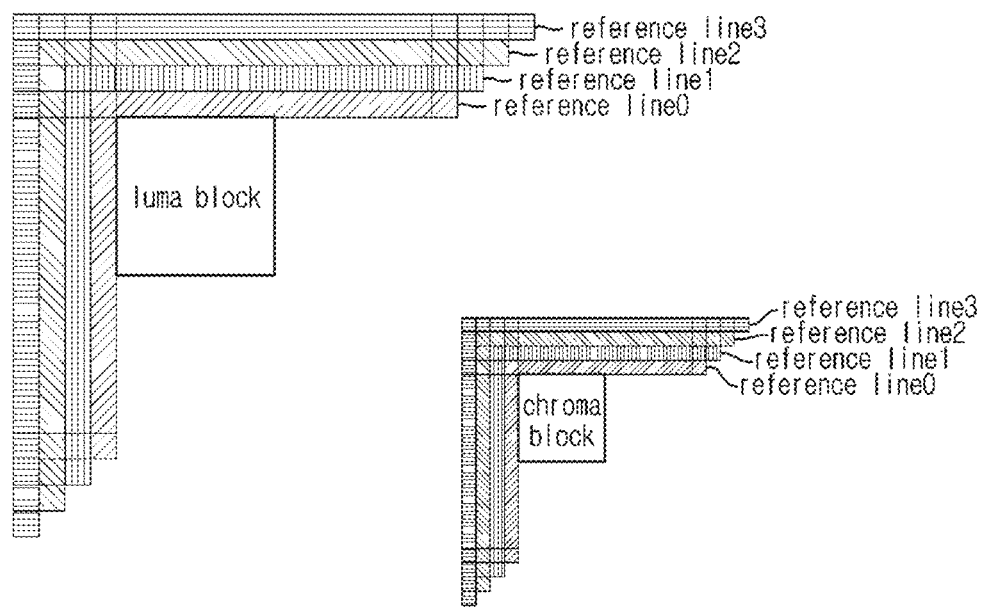
FIG. 20 is a view for explaining a reference line of a current chroma block and a reference line of the corresponding luma block in YUV4:4:4 format.

For at least one among positions of the corresponding luma block illustrated in FIG. 20, a reference line index of a luma block may be used to determine a reference line that will be used for the prediction of a current chroma block. Herein, the position of a neighboring block to be used may be differently determined according to color format.

A reference line index of a luma block may be expressed as IntraLumaRefLineIdx. A reference line index of a current chroma block may be expressed as IntraChromaRefLineIdx. IntraLumaRefLineIdx and IntraChromaRefLineIdx may be any positive integers including 0 respectively.

For example, in YUV4:4:4 format or YUV4:2:2 format, IntraChromaRefLineIdx may be derived as IntraLumaRefLineIdx. Herein, a current chroma block and the corresponding luma block may use a same number of reference lines. In addition, a maximum value of a reference line index may also be same. In this case, information on IntraChromaRefLineIdx may not be signaled through a bitstream. IntraChromaRefLineIdx may be implicitly derived by using IntraLumaRefLineIdx.

For example, in YUV4:2:0 format, IntraChromaRefLineIdx may be derived as a floor (IntraLumaRefLineIdx/2) value. Floor( ) may mean a function that discards a decimal portion of a number. Herein, the number of reference lines of a current chroma block may be ½ of the number of reference lines of the corresponding luma block. In addition, a maximum value of a reference line index of a current chroma block may be ½ of a maximum value of a reference line index of the corresponding luma block. In this case, information on IntraChromaRefLineIdx may not be signaled through a bitstream. IntraChromaRefLineIdx may be implicitly derived by using IntraLumaRefLineIdx.

FIG. 20 is a view for explaining a reference line of a current chroma block and a reference line of the corresponding luma block in YUV4:4:4 format.

For example, when a prediction mode of the corresponding luma block is a planar mode and a first reference line is used, in other words, when IntraPredModeY is a planar mode and IntraLumaRefLineIdx is a first value, a candidate mode list of a current chroma block may be configured by including at least one among a vertical-diagonal mode, a vertical mode, a horizontal mode, a DC mode, and a planar mode. In addition, a first reference line (reference line 0) of a current chroma block may be used for prediction.

For example, when a prediction mode of the corresponding luma block is a vertical mode and a second reference line is used, in other words, when IntraPredModeY is a vertical mode and IntraLumaRefLineIdx is a second value, a candidate mode list of a current chroma block may be configured by including at least one among a planar mode, a vertical-diagonal mode, a horizontal mode, a DC mode, and a vertical mode. In addition, a second reference line (reference line 1) of a current chroma block may be used for prediction.

For example, when a prediction mode of the corresponding luma block is a horizontal mode and a third reference line is used, in other words, when IntraPredModeY is a horizontal mode and IntraLumaRefLineIdx is a third value, a candidate mode list of a current chroma block may be configured by including at least one among a planar mode, a vertical mode, a vertical-diagonal mode, a DC mode, and a horizontal mode. In addition, a third reference line (reference line 2) of a current chroma block may be used for prediction.

For example, when a prediction mode of the corresponding luma block is a DC mode and a fourth reference line is used, in other words, when IntraPredModeY is a DC mode and IntraLumaRefLineIdx is a fourth value, a candidate mode list of a current chroma block may be configured by including at least one among a planar mode, a vertical mode, a horizontal mode, a vertical-diagonal mode, and a DC mode. In addition, a fourth reference line (reference line 3) of a current chroma block may be used for prediction.

Table 2 presents a method of configuring a candidate mode list of a current chroma block, when a current chroma block is an LM (Linear Mode), that is, when cclm_enabled_flag is a second value.

TABLE 2

| prediction candidate mode list of a chroma block | prediction candidate mode list of a luma block | | | | |
|---|---|---|---|---|---|
| | 0(Planar) | 50(vertical) | 18(horizontal) | 1(DC) | x(0 ≤ x ≤ 66) |
| 0 | 66 | 0 | 0 | 0 | 0 |
| 1 | 50 | 66 | 50 | 60 | 50 |
| 2 | 18 | 18 | 66 | 18 | 18 |
| 3 | 1 | 1 | 1 | 66 | 1 |
| 4 | 81 | 81 | 81 | 81 | 891 |
| 5 | 82 | 82 | 82 | 82 | 82 |
| 6 | 83 | 83 | 83 | 83 | 83 |
| 7 | 0 | 50 | 18 | 1 | x |

Referring to Table 2, in order to configure a candidate mode of a current chroma block, at least one of a DM using a prediction mode of the corresponding luma block and an LM may be used.

An LM is a mode that predicts a pixel value of a current chroma block by using an encoded/decoded pixel value of the corresponding luma block corresponding to a current chroma block.

Prediction according to an LM may be performed by using the following equation (1).

$$pred_c(i,j) = a * rec_L(i,j) + b \quad \text{Equation (1):}$$

In Equation (1), $pred_c(i,j)$ may mean a current chroma block and $rec_L(i,j)$ may mean the reconstructed corresponding luma block. a and b may be derived on the basis of a neighboring block adjacent to a current chroma block and an adjacent block of the corresponding luma block. Particularly, a linear regression mode or a linear model may be derived by deriving a and b using the correlation between neighboring pixels of the corresponding luma block and neighboring pixels of a current chroma block or using a maximum value and a minimum value of neighboring pixels respectively.

In order to derive a and b, information on at least one among neighboring samples of a current chroma block, neighboring samples of the corresponding luma block, and a reference line index of the corresponding luma block may be used. Herein, the position of a neighboring block to be used may be differently determined according to color format.

For example, in YUV4:4:4 format or YUV4:2:2 format, a reference line at the same position as a reference line of the corresponding luma block indicated by a reference line index of the corresponding luma block may also be used for a current chroma block.

For example, in YUV4:2:0 format, a reference line index of a current chroma block (IntraChromaRefLineIdx) may be derived as a value of floor (IntraLumaRefLineIdx/2). In addition, when only some samples (for example, even-numbered samples) in the corresponding reference line are used, the number of luma samples and the number of chroma samples may agree with each other. In other words, when four luma samples correspond to one chroma sample, one luma sample may be extracted from four luma samples and be used. Alternatively, a value of one representative luma sample may be derived by using a statistical value of some or all of four luma samples. Herein, a statistical value may be at least one among an average value, a maximum value, a minimum value, and a median value.

For example, by deriving an average or a weighted average for a plurality of luma samples, downsampling may be performed on the plurality of luma samples. A sample value obtained by downsampling may be a representative luma sample value for the plurality of luma samples. A plurality of luma samples may include a luma sample at a target position and two luma samples located at the left and right of the luma sample. Alternatively, a plurality of luma samples may include a luma sample at a target position and two luma samples located above and below the luma sample. Alternatively, a plurality of luma samples may include a luma sample at a target position and four luma samples located left, right, above and below the luma sample. However, the above examples are not exhaustive, and a plurality of luma samples may include a luma sample at a target position and N neighboring samples.

The downsampling may also be applied to neighboring samples of a luma block corresponding to a current chroma block. In addition, among sample values obtained by downsampling on neighboring samples of a luma block, a maximum value and a minimum value may be used to derive parameters a and b of a linear model. Here, an average value of a first largest value and a second largest value among downsampled sample values may be determined as the maximum value. In addition, an average value of a first smallest value and a second smallest value among downsampled samples may be determined as the minimum value.

Figure 21:
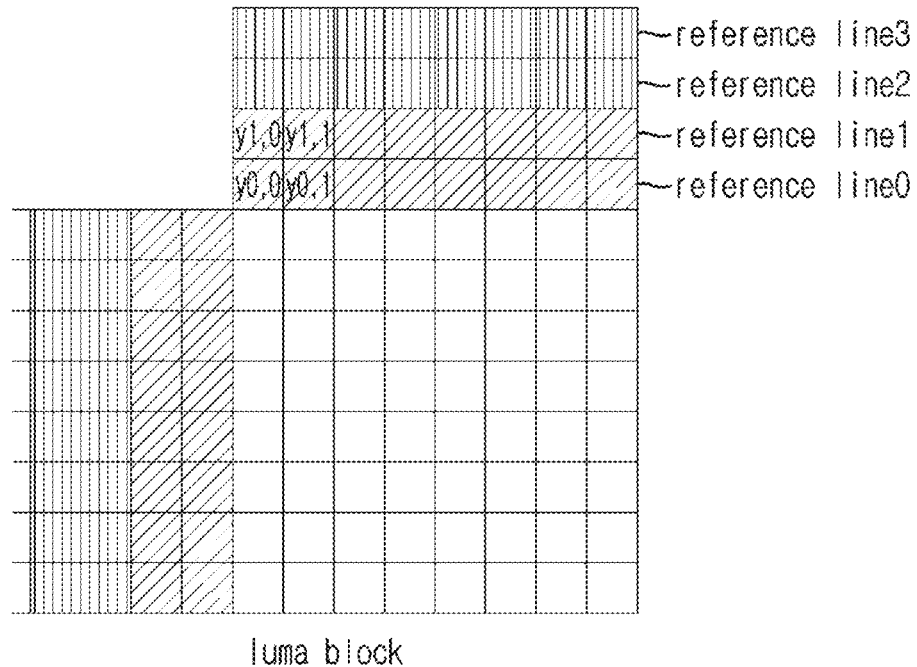
FIG. 21 is a view for explaining neighboring samples that are used to derive a linear regression model or a linear model in YUV4:2:0 format.
Figure 21:
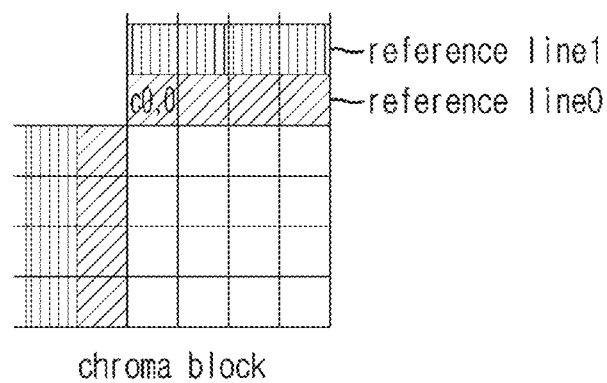

FIG. 21 is a view for explaining neighboring samples that are used to derive a linear regression model or a linear model in YUV4:2:0 format.

Referring to FIG. 21, in order to derive parameters a and b of a linear regression model or a linear model, an encoder/decoder may use a reference line indicated by the same index as a reference line index N of the corresponding luma block for a current chroma block.

For example, when the corresponding luma block uses a first reference line (reference line0) or a second reference line (reference line1), that is, when IntraLumaRefLineIdx is a first value or a second value, a and b may be derived by using a first reference line of a current chroma block.

For example, when the corresponding luma block uses a third reference line (reference line2) or a fourth reference line (reference line3), that is, when IntraLumaRefLineIdx is a third value or a fourth value, a and b may be derived by using a second reference line of a current chroma block.

For example, when a luma block of FIG. 21 is predicted by using a reference line 0, a linear regression mode or a linear mode may be derived by using a reference line 0 of a luma block and a reference line 0 of a chroma block. Herein, luma samples corresponding to an adjacent sample c0,0 of a current chroma block may be (y0,0), (y0,1), (y1,0) and (y1,1). As mentioned above, one representative luma sample value may be derived from the four luma samples.

Herein, according to an intra-prediction mode of a current chroma block, a method of predicting an LM may be differently determined. An intra-prediction mode of a current chroma block may be expressed as IntraPredModeC. For example, when IntraPredModeC is a first value, an LT_CCLM prediction method may be implemented. In addition, when IntraPredModeC is a second value, an L_CCLM prediction method may be implemented. In addition, when IntraPredModeC is a third value, a T_CCLM prediction method may be implemented. In Table 2, a first value, a second value and a third value may be 81, 82 and 83 respectively.

An LT_CCLM prediction method may mean a method of deriving a parameter of a linear mode by using an upper neighboring block and a left neighboring block of a current chroma block and an upper neighboring block and a left neighboring block of the corresponding luma block. An L_CCLM prediction method may mean a method of deriving a parameter of a linear mode by using a left neighboring block of a current chroma block and a left neighboring block of the corresponding luma block. A T_CCLM prediction method may mean a method of deriving a parameter of a linear mode by using an upper neighboring block of a current chroma block and an upper neighboring block of the corresponding luma block.

For example, when a current chroma block uses an L_CCLM prediction method and the corresponding luma block uses a first reference line or a second reference line, that is, when IntraPredMode is a second value and IntraLumaRefLineIdx is a first value or a second value, parameters a and b of a linear model may be derived by using a first reference line that is adjacent to the left of a current chroma block.

For example, when a current chroma block uses a T_CCLM prediction method and the corresponding luma block uses a third reference line or a fourth reference line, that is, when IntraPredMode is a third value and IntraLumaRefLineIdx is a third value or a fourth value, parameters a and b of a linear model may be derived by using a second reference line that is adjacent to the upper end of a current chroma block.

For intra prediction of a current luma block, some of reference line 0 to reference line 3 may be used. In addition, some of reference line 0 to reference line 3 may be used to derive parameters a and b of CCLM.

In this case, an available reference line for intra prediction of a current luma block may be the same as an available reference line for deriving a parameter of CCLM. For example, in both cases, only three reference lines of reference line 0 to reference line 2 may be used. In other words, available reference lines for intra prediction of a current luma block may be reference line 0 to reference line 2, and available reference lines for deriving a parameter of CCLM may be reference 0 to reference line 2.

Hereinafter, signaling (entropy encoding/decoding) of information on an intra-prediction mode will be explained.

An encoder/decoder may entropy encode/decode information on an intra-prediction mode. Information on an intra-prediction mode may include at least one among a reference line index, an MPM flag, a remaining mode, and an MPM index. An encoder/decoder may entropy encode/decode a reference line index representing a reference line that is used for the prediction of a current block. The corresponding index may be expressed as intra_luma_ref_idx. A maximum value of a reference line index may be determined according to the number of available reference lines. When the number of reference lines is N (any positive integer), if a reference line index is a N-th value, it may be indicated that a N-th reference line is used.

An encoder/decoder may entropy encode/decode an MPM flag indicating whether or not a same mode as a prediction mode of a current block is present in an MPM list. The corresponding flag may be expressed as intra_luma_mpm_flag. When intra_luma_mpm_flag is a first value, it may mean that a same mode as a prediction mode of an encoding/decoding target block is not present in an MPM list. When intra_luma_mpm_flag is a second value, it may mean that a same mode as a prediction mode of an encoding/decoding target block is present in an MPM list.

When intra_luma_mpm_flag exists and the corresponding flag value is a first value, an encoder/decoder may additionally entropy encode/decode a remaining mode. A remaining mode may mean modes that do not belong to an MPM list. A remaining mode may be expressed as intra_luma_mpm_remainder. An encoder/decoder may derive a prediction mode of a current block by using an MPM flag, a remaining mode and an MPM list.

When intra_luma_mpm_flag exists and the corresponding flag value is a second value, an encoder/decoder may additionally entropy encode/decode an MPM index. An MPM index is an index indicating which candidate mode among modes in an MPM list is the same as a prediction mode of an encoding/decoding target block. An MPM index may be expressed as intra_luma_mpm_idx. An encoder/decoder may derive a prediction mode of a current block by using an MPM flag, an MPM index and an MPM list.

In the above embodiment, a first value may mean 0, a second value may mean 1, a third value may mean 2, and a N-th value may mean N−1.

Whether or not a CCLM is performed for a current chroma block may be determined based on at least one among the size (area) of a current block, a height and a width of a current block. A CCLM (Cross-Component Linear Mode) may mean an LM (Linear Mode). A CCLM may include at least one among an LT_CCLM, an L_CCLM, and a T_CCLM.

An LT_CCLM is a mode that derives parameters (a and b) of a linear mode by using at least one among samples of a reconstructed left neighboring block and at least one among samples of a reconstructed upper neighboring block. An LT_CCLM may also be expressed as INTRA_LT_CCLM.

An L_CCLM is a mode that derives a parameter of a linear mode by using at least one among samples of a reconstructed left neighboring block. An L_CCLM may also be expressed as INTRA_L_CCLM.

A T_CCLM is a mode that derives a parameter of a linear mode by using at least one among samples of a reconstructed upper neighboring block. A T_CCLM may also be expressed as INTRA_T_CCLM.

In each of LT_CCLM, L_CCLM and T_CCLM, by using a derived linear model, a current chroma block may be predicted from a reconstructed corresponding luma block.

Whether or not CCLM may be performed for a current block may be determined based on various encoding/decoding information.

For example, when information signaled through a parameter set (SPS, PPS and the like) or a header indicates that a CCLM is not available, a CCLM may not be performed for all the blocks referring to the corresponding parameter set.

When a chroma block and a luma block are partitioned into a single tree structure, CCLM may be determined to be available for a current block.

In addition, whether or not a CCLM is available may be determined based on a type of slice to which a current block belongs. For example, when a slice to which a current block belongs is a P slice or a B slice, it may be determined that a CCLM is available for a current block.

In addition, when a size of a coding tree block is smaller than 64×64, CCLM may be determined to be available for a current block.

When a chroma block and a luma block are partitioned into a single tree structure, if a chroma block obtained by partitioning is smaller than a smallest chroma block size, the partitioning may not be performed for a chroma block. For example, a smallest chroma block size may be 16 samples. In other words, a smallest chroma block may be a block including 16 samples. Information on the size of a smallest chroma block may be predefined in an encoder/decoder. Alternatively, information on the size of a smallest chroma block may be signaled, being included in a bitstream. Information on a smallest chroma block size may be expressed as at least one form among a block area, the number of samples included by a block, a width and/or a height of a block.

For example, when a current block is an 8×4 chroma block, if a current block is partitioned into a ternary tree structure, a 2×4 chroma block may be obtained. In other words, a chroma block including 8 samples, which are smaller in number than 16 samples, may be obtained. Accordingly, ternary tree partitioning for an 8×4 chroma block may be prohibited.

For example, when a current block is an 8×4 chroma block, if a current block is partitioned into a binary tree structure, two 4×4 chroma blocks may be obtained. Both of two chroma blocks thus obtained include 16 samples. Accordingly, binary tree partitioning for an 8×4 chroma block may not be prohibited.

In the above example, the limitation of partitioning may not be applicable to a luma block corresponding to a current chroma block. In other words, according to the partitioning limitation of a chroma block, a partition structure of a chroma block and a luma block may be differently determined.

When a chroma block and a luma block are partitioned into a dual tree structure, partitioning for a chroma block with a size that is smaller than a predetermined size may be limitedly performed. Information on the predetermined size may be predefined in an encoder/decoder. Alternatively, information on the predetermined size may be signaled, being included in a bitstream. Information on the predetermined size may be expressed as at least one form among a block area, the number of samples included by a block, a width and/or a height of a block.

For example, when a width (or height) of a current chroma block is 4, quadtree partitioning may be prohibited. For example, when a current chroma block includes 16 or less samples, binary tree partitioning may be prohibited. For example, when a current chroma block includes 32 or less samples, ternary tree partitioning may be prohibited.

Only when a size of a current chroma block is larger than a predetermined size, an intra-prediction mode may be signaled. When a size of a current chroma block is equal to or smaller than a predetermined size, an intra-prediction mode of the block may be determined as a DC mode. Herein, a predetermined size may be a size of a block including 8 samples.

As described above, in a single tree structure and a double tree structure, a 2×2, 4×2 or 2×4 chroma block may be removed by limiting the partitioning of a chroma block. In other words, partitioning into a 2×2, 4×2 or 2×4 chroma block may be prohibited to be performed. Thus, the complexity of hardware may be reduced.

In addition, in comparison with a predetermined threshold value, whether or not to perform CCLM prediction for a current block may be determined. For example, for a block with a size that is equal to or less than a predetermined threshold value, CCLM may not be performed. A predetermined threshold value may be predefined in an encoder/decoder. Alternatively, information on a predetermined threshold value may be signaled at a higher level (parameter set or header) of a block. A predetermined threshold value, for example, may be signaled, being included at least one among VPS, DPS, SPS, PPS, APS, a tile group, a tile header, and a slice header. A predetermined threshold value may be compared with a size of a current block or an area of a current block. Alternatively, a predetermined threshold value may be compared with a height and a width of a current block and/or a height of a shorter side. Alternatively, a predetermined threshold value may be compared with at least one among a block area, the number of samples included by a block, a width and/or a height of a block.

For example, when the threshold value is smaller, CCLM may be performed for the corresponding block. In addition, when the threshold value is equal or larger, CCLM may not be performed for the corresponding block. For example, when both a width and a height of a block are 64, CCLM may be applied for the corresponding block. Alternatively, when a width of a block is 64 and a height is 32, CCLM may be applied for the corresponding block.

For example, the threshold value may be defined as a formula of log 2 (A) or log 2 (A)–log 2 (M). When an area of a current chroma block or the corresponding luma block is less than A or equal to or less than A, a CCLM prediction for a current chroma block may be skipped. A may be an area of a luma block or an area of a chroma block to which CCLM is to be prohibited. An area of a block may be calculated by multiplying a width and a height of the block. M may be an area of a smallest block available. A and M may be positive integers including 0 respectively.

Whether or not to perform CCLM according to a size (area) of each block may be signaled through a parameter set or a header. Alternatively, whether or not to perform CCLM according to a size of a block may be predefined in an encoder/decoder and may be used, being thus predetermined.

For example, the threshold value may be defined as a formula of log 2 (A) or log 2 (A)–log 2 (M). When a shorter one of a width and a height of a current chroma block or the corresponding luma block is less than A or equal to or less than A, a CCLM prediction for a current chroma block may be skipped. A may be a width or a height of a chroma block or a luma block, and M may be a width or a height of a smallest block available or a shorter one of the two.

Whether or not to perform CCLM according to a shorter one of a width and a height of each block may be signaled through a parameter set or a header. Alternatively, whether or not to perform CCLM according to a width (or height) of a block may be used, being predetermined.

In the above embodiment, whether or not to perform CCLM prediction may be indicated by a flag for whether or not CCLM prediction is allowed. For example, when CCLM prediction is not performed, a flag for whether or not CCLM prediction is allowed may have a first value (for example, 0). In addition, when CCLM prediction is performed, a flag for whether or not CCLM prediction is allowed may have a second value (for example, 1).

For example, an encoder/decoder may skip CCLM prediction, when a size (area) of a current chroma block or the corresponding luma block is less than N×M, equal to N×M, or equal to or less than N×M, which is a predefined value. Herein, N and M may be positive integers respectively, which are not 0. Herein, N×M may be, for example, 4×2, 4×4 or 2×4.

For example, an encoder/decoder may skip CCLM prediction, when a shorter one of a width and a height of a current chroma block or the corresponding luma block is less than N or equal to or less than N that is a predefined value.

Skipping CCLM prediction may mean that CCLM prediction is not performed. Alternatively, skipping CCLM prediction may mean that CCLM is set not to be performed in an encoder/decoder. When CCLM prediction is not skipped, it may mean that CCLM is performed for the corresponding block.

When entropy encoding/decoding an intra chroma prediction mode, entropy encoding/decoding of information on at least one or more CCLMs may be skipped according to a size (area) of a block or a height and a width of a block.

Skipping entropy encoding/decoding may mean that information on a CCLM of the corresponding block is not entropy encoded/decoded. In addition, if not the corresponding block, it may mean that information on a CCLM is entropy encoded/decoded.

For example, when entropy encoding/decoding is performed for a block with an area that is equal to or less than a threshold value, except at least one CCLM among intra chroma prediction modes, at least one of binarization/debinarization and entropy encoding/decoding may be performed. For a block with a size that is larger than a threshold value, without excluding at least one CCLM among intra chroma prediction modes, at least one of binarization/debinarization and entropy encoding/decoding may be performed.

For example, when entropy encoding/decoding is performed for a block of which a width, a height or a shorter one of the two is less than a threshold value or equal to or less than a threshold value, except at least one CCLM among intra chroma prediction modes, at least one of binarization/debinarization and entropy encoding/decoding may be performed. In an opposite case, at least one of binarization/debinarization and entropy encoding/decoding may be performed without excluding at least one or more CCLMs among intra chroma prediction modes.

The threshold value may be signaled, being defined in the parameter set or header or may be a value that is predefined in an encoder/decoder.

Table 3 is an embodiment showing a relation between an index of an intra-prediction mode and an intra-prediction mode.

TABLE 3

| Intra prediction mode | Associated name |
|---|---|
| 0 | INTRA PLANAR |
| 1 | INTRA DC |
| 2 ... 66 | INTRA ANGULAR2 ... INTRA ANGULAR66 |
| 81 ... 83 | INTRA LT CCLM, INTRA L CCLM, INTRA T CCLM |

For example, when an index for an intra chroma prediction mode is 0, a planar prediction mode may be meant. For example, when an index for an intra chroma prediction mode is 1, a DC prediction mode may be meant. For example, when an index for an intra chroma prediction mode is 2 to 66, it may mean a prediction mode according to the corresponding direction. For example, when an index for an intra chroma prediction mode is 81 to 83, it may mean INTRA_LT_CCLM, INTRA_L_CCLM, INTRA_T_CCLM.

Table 4 is an embodiment showing a value of a syntax element (intra_chroma_pred_mode) for an intra chroma prediction mode, which is a value encoded/decoded in an entropy encoding/decoding process, and an index for the corresponding intra chroma prediction mode. Herein, an index for an intra chroma prediction mode may mean an index presented in Table 3.

TABLE 4

| intra_chroma_pred_mode[xCb][yCb] | IntraPredModeY[ xCB + cbWidth/2][yCb + cbHeight/2] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

Table 5 is an embodiment showing an index for an intra-prediction mode of a chroma block and the corresponding bin string, when a CCLM is indicated to be not available at a sequence, picture, tile, slice, or CTU level.

TABLE 5

| Binarization for intra_chroma_pred_mode when sps_cclm_enabled_flag is equal to 0 | |
|---|---|
| Value of intra_chroma_pred_mode | Bin string |
| 4 | 0 |
| 0 | 100 |
| 1 | 101 |
| 2 | 110 |
| 3 | 111 |

For example, when an intra-prediction mode of a chroma block is a DM (intra_chroma_pred_mode=4), a shortest bin string may be allocated. When an intra-prediction mode of a chroma block is not a DM (intra_chroma_pred_mode*4), a bin string of equal length may be allocated. In other words, a length of a bin string corresponding to a mode that is not a DM may be larger than a length of a bin string corresponding to a DM.

Table 6 is an embodiment showing an index for an intra-prediction mode of a chroma block and the corresponding bin string, when a CCLM is shown to be available at a sequence, picture, tile, slice, or CTU level and whether or not to perform a CCLM is limited according to an area of a block.

TABLE 6

| Binarization for intra_chroma_pred_mode when sps_cclm_enabled_flag is equal to 1 | | |
|---|---|---|
| Value of intra_chroma_pred_mode | Bin string (nTbW * nTbH) > α | Bin string (nTbW * nTbH) <= α |
| 7 | 0 | 0 |
| 4 | 10 | — |
| 5 | 1110 | — |
| 6 | 1111 | — |
| 0 | 11000 | 100 |
| 1 | 11001 | 101 |
| 2 | 11010 | 110 |
| 3 | 11011 | 111 |

The second column of Table 6 is an embodiment where a bin string corresponds to an intra chroma prediction mode, when a current block is a relatively large block, that is, an area of a chroma block exceeds a threshold value (a), and at least one among CCLMs is allowed. When a CCLM is allowed, it means that an encoder/decoder may use a CCLM for a chroma block with a size exceeding a threshold value. In this case, an encoder/decoder may entropy encode/decode an intra chroma prediction mode including at least one among CCLMs for the corresponding block.

The third column of Table 6 is an embodiment where a bin string corresponds to an intra chroma prediction mode, when a current block is a relatively small block, that is, an area of a chroma block is equal to or less than a threshold value (a), and at least one among CCLMs is restricted. When an CCLM is restricted, it means that an encoder/decoder may not use a CCLM for a chroma block equal to or less than a threshold value. In this case, an encoder/decoder may entropy encode/decode an intra chroma prediction mode that does not include at least one among CCLMs for the corresponding block.

Because CCLM is not performed for a relatively small block, a bin string, which is a binarization result for modes 0 to 3 (Planar, Vertical, Horizontal, DC or INTRA_ANGULAR66), may be changed. In other words, as presented in Table 6, a bin string for corresponding modes of a relatively small block may be shorter than a bin string for corresponding modes of a relatively large block.

Table 7 is an embodiment describing an entropy encoding/decoding method for a bin string of an intra chroma prediction mode.

TABLE 7

| Syntax element | binIdx | | | | | |
|---|---|---|---|---|---|---|
| | 0 | 1 | 2 | 3 | 4 | >=5 |
| intra_chroma_pred_mode[ ][ ]<br>sps_cclm_enabled_flag == 0 | 0 | bypass | bypass | na | na | na |
| intra_chroma_pred_mode[ ][ ]<br>sps_cclm_enabled_flag == 1 &&<br>(nTbW * nTbH) == α | 0 | bypass | bypass | na | na | na |
| intra_chroma_pred_mode[ ][ ]<br>sps_cclm_enabled_flag == 1 &&<br>bin at binIdx equal to 2 == 0 &&<br>(nTbW * nTbH) > α | 0 | 1 | 2 | bypass | bypass | na |
| intra_chroma_pred_mode[ ][ ]<br>sps_cclm_enabled_flag == 1 &&<br>bin at binIdx equal to 2 == 0 &&<br>(nTbW * nTbH) > α | 0 | 1 | 2 | 2 | na | na |

As described in Table 7, based on information on whether or not a CCLM signaled at a sequence, picture, tile, slice or CTU level is available (sps_cclm_enabled_flag), whether or not an area of a chroma block (nTbW*nTbH) is equal to or less than a threshold value (cv), and/or whether or not bin 2 is 0 (that is, whether or not a mode of a current block is INTRA_L_CCLM or INTRA_T_CCLM), an entropy encoding/decoding method for a bin string may be differently determined (whether bypassing coding or regular coding). For example, in the case of regular coding, there may exist a corresponding value to each binIdx, and a context model may be adaptively selected by using the value.

Table 8 is another embodiment showing a relation among cclm_mode_flag, cclm_mode_idx, intra_chroma_pred_mode, and lumaIntraPredMode, which are entropy encoded/decoded when sps_cclm_enabled_flag is 1.

TABLE 8

| cclm_mode_flag | cclm_mode_idx | intra_chroma_pred_mode | lumaIntraPredMode | | | | |
|---|---|---|---|---|---|---|---|
| | | | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

In Table 8, cclm_mode_flag is 0, intra_chroma_pred_mode=4 is a DM, cclm_mode_flag is 1, cclm_mode_idx=0 is a LT_CCLM, cclm_mode_flag is 1, cclm_mode_idx=1 is an L_CCLM, cclm_mode_flag is 1, and cclm_mode_idx=2 may mean a T_CCLM.

As another example of Table 5, Table 9 is another embodiment showing an index for an intra-prediction mode of a chroma block and the corresponding bin string.

Table 9 is commonly applicable to cases where sps_cclm_enabled_flag is 0 and 1 respectively.

TABLE 9

| Value of intra_chroma_pred_mode | Bin string |
|---|---|
| 0 | 100 |
| 1 | 101 |

TABLE 9-continued

| Value of intra_chroma_pred_mode | Bin string |
|---|---|
| 2 | 110 |
| 3 | 111 |
| 4 | 0 |

In Table 9, the first bin indicates whether an intra-prediction mode is a DM (0) or not (1). When an intra-prediction mode is a mode but not a DM, the next bins are the same as explained with reference to Table 5.

Among block partitioning methods, this invention may be applied to implicitly performing encoding/decoding not only in a dual tree structure or a separate tree structure, where block partitioning methods for a luma component and a chroma component may have tree structures independent to each other, but also in a single tree structure. Alternatively, this invention may be applied only in a dual tree structure or a separate tree structure. According to this invention, encoding/decoding throughput for a relatively small block may be improved.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method performed by an image decoding apparatus, the image decoding method comprising:
    deriving a value of a first flag indicating whether an MPM mode is applied for a current block;
    deriving, based on the value of the first flag, a value of a second flag indicating whether an intra prediction mode of the current block is a Planar mode;
    deriving, based on the value of the second flag, the intra prediction mode of the current block; and
    generating a prediction block of the current block by performing an intra prediction for the current block based on the intra prediction model,
    wherein the deriving the value of the second flag is performed based on whether a reference sample line used for the intra prediction of the current block is a first reference sample line directly adjacent to the current block.

2. The image decoding method of claim 1,
    wherein, in case the reference sample line used for the intra prediction of the current block is the first reference sample line, the deriving the value of the second flag is performed by decoding the second flag obtained from a bitstream.

3. The image decoding method of claim 1,
wherein, in case the reference sample line used for the intra prediction of the current block is not the first reference sample line, the second flag is not obtained from a bitstream and the value of the second flag is inferred to be a value indicating that the intra prediction mode of the current block is not the Planar mode.

4. The image decoding method of claim 1,
wherein, in case the value of the second flag indicates that the intra prediction mode of the current block is not the Planar mode, the deriving the intra prediction mode of the current block comprises deriving a predetermined number of MPM candidate modes based on a first intra prediction mode of a first neighboring block of the current block and a second intra prediction mode of a second neighboring block of the current block.

5. The image decoding method of claim 4,
wherein, in case the intra prediction mode of the first neighboring block or the intra prediction mode of the second neighboring block is not available, a Planar mode is used instead of the unavailable intra prediction mode of the neighboring block.

6. The image decoding method of claim 4,
wherein, in case both the first intra prediction mode and the second intra prediction mode are non-directional modes, the predetermined number of MPM candidate modes includes a DC mode, a vertical mode, a horizontal mode, a (vertical mode-4) mode and a (vertical mode+4) mode.

7. The image decoding method of claim 4,
wherein, in case both the first intra prediction mode and the second intra prediction mode are directional modes different from each other, the predetermined number of MPM candidate modes includes the first intra prediction mode and the second intra prediction mode, and
the predetermined number of MPM candidate modes further includes additional MPM candidate modes determined based on a difference value between the first intra prediction mode and the second intra prediction mode.

8. The image decoding method of claim 7,
wherein the additional MPM candidate modes are modes adjacent to the first intra prediction mode or the second intra prediction mode.

9. The image decoding method of claim 4,
wherein, in case one among the first intra prediction mode and the second intra prediction mode is a directional mode and the other is a non-directional mode, the predetermined number of MPM candidate modes includes the directional mode and modes adjacent to the directional mode and does not include the non-directional mode.

10. An image encoding method performed by an image encoding apparatus, the image encoding method comprising:
determining an intra prediction mode of a current block;
generating a prediction block of the current block by performing an intra prediction for the current block based on the intra prediction mode;
encoding a first flag indicating whether an MPM mode is applied for the current block;
encoding, based on a value of the first flag, a second flag indicating whether the intra prediction mode of the current block is a Planar mode; and
encoding, based on a value of the second flag, the intra prediction mode of the current block,
wherein the encoding the second flag is performed based on whether a reference sample line used for the intra prediction of the current block is a first reference sample line directly adjacent to the current block.

11. The image encoding method of claim 9,
wherein, in case the reference sample line used for the intra prediction of the current block is the first reference sample line, the encoding the second flag encodes the second flag into a bitstream.

12. The image encoding method of claim 9,
wherein, in case the reference sample line used for the intra prediction of the current block is not the first reference sample line, the second flag is not encoded into a bitstream and the value of the second flag is inferred to be a value indicating that the intra prediction mode of the current block is not the Planar mode.

13. The image encoding method of claim 10,
wherein, in case the intra prediction mode of the current block is not the Planar mode, the encoding the intra prediction mode of the current block comprises deriving a predetermined number of M PM candidate modes based on a first intra prediction mode of a first neighboring block of the current block and a second intra prediction mode of a second neighboring block of the current block.

14. The image encoding method of claim 13,
wherein, in case the intra prediction mode of the first neighboring block or the intra prediction mode of the second neighboring block is not available, a Planar mode is used instead of the unavailable intra prediction mode of the neighboring block.

15. The image encoding method of claim 13,
wherein, in case both the first intra prediction mode and the second intra prediction mode are non-directional modes, the predetermined number of MPM candidate modes includes a DC mode, a vertical mode, a horizontal mode, a (vertical mode-4) mode and a (vertical mode+4) mode.

16. The image encoding method of claim 13,
wherein, in case both the first intra prediction mode and the second intra prediction mode are directional modes different from each other, the predetermined number of MPM candidate modes includes the first intra prediction mode and the second intra prediction mode, and
the predetermined number of MPM candidate modes further includes additional MPM candidate modes determined based on a difference value between the first intra prediction mode and the second intra prediction mode.

17. The image encoding method of claim 13,
wherein, in case one among the first intra prediction mode and the second intra prediction mode is a directional mode and the other is a non-directional mode, the predetermined number of MPM candidate modes includes the directional mode and modes adjacent to the directional mode and does not include the non-directional mode.

18. A non-transitory computer readable recording medium storing a bitstream that is generated by an image encoding method, the image encoding method comprising:
determining an intra prediction mode of a current block;
generating a prediction block of the current block by performing an intra prediction for the current block based on the intra prediction mode;
encoding a first flag indicating whether an MPM mode is applied for the current block;

encoding, based on a value of the first flag, a second flag indicating whether the intra prediction mode of the current block is a Planar mode; and encoding, based on a value of the second flag, the intra prediction mode of the current block, wherein the encoding the second flag is performed based on whether a reference sample line used for the intra prediction of the current block is a first reference sample line directly adjacent to the current block.

\* \* \* \* \*